(12) United States Patent
    Donikian

(10) Patent No.: US 11,522,856 B2
(45) Date of Patent: Dec. 6, 2022

(54) SYSTEM AND METHOD FOR SELECTING AN ELECTRONIC COMMUNICATION PATHWAY FROM A POOL OF POTENTIAL PATHWAYS

(71) Applicant: Johann Donikian, Shrewsbury, MA (US)

(72) Inventor: Johann Donikian, Shrewsbury, MA (US)

(73) Assignee: Johann Donikian, Shrewsbury, MA (US)

( * ) Notice: Subject to any disclaimer, the term of this patent is extended or adjusted under 35 U.S.C. 154(b) by 45 days.

(21) Appl. No.: 17/120,384

(22) Filed: Dec. 14, 2020

(65) Prior Publication Data

US 2021/0099446 A1    Apr. 1, 2021

Related U.S. Application Data

(63) Continuation-in-part of application No. 16/777,236, filed on Jan. 30, 2020, now Pat. No. 10,880,811.
(Continued)

(51) Int. Cl.
    *H04L 9/40*       (2022.01)
    *H04L 45/00*      (2022.01)
    (Continued)

(52) U.S. Cl.
    CPC ......... *H04L 63/0876* (2013.01); *G06N 20/00* (2019.01); *H04L 45/70* (2013.01); *H04L 63/0861* (2013.01); *H04W 12/06* (2013.01)

(58) Field of Classification Search
    CPC . H04L 63/0876; H04L 45/70; H04L 63/0861; H04L 45/08; G06N 20/00; H04W 12/06
    See application file for complete search history.

(56) References Cited

U.S. PATENT DOCUMENTS 7,162,446 B1    1/2007  Handler
7,630,381 B1 *  12/2009 Roskind ................. H04L 51/20
                                              370/395.42
(Continued)

FOREIGN PATENT DOCUMENTS

WO    2001073621    10/2001
WO    2011089242    7/2011

OTHER PUBLICATIONS

PCT/US21/15158; International Search Report; dated Jun. 4, 2021; Authorized Officer: Lee Young.

*Primary Examiner* — Will W Lin
(74) *Attorney, Agent, or Firm* — Caldwell Intellectual Property Law

(57) ABSTRACT

A system for selecting an electronic communication pathway from a pool of potential pathways. The system includes a network communication routing hub operating on at least a server wherein the network communication routing hub selects an electronic communication pathway from a plurality of electronic communication pathways. The at least a server is configured to include an authorization module wherein the authorization module is configured to authenticate each device of the plurality of remote devices. The system includes a pathway selection module operating on the at least a server wherein the pathway selection module is configured to select based on a pathway probability variable a pathway from the plurality of electronic communication pathways and transmit an outgoing communication over the selected pathway to a remote device of the plurality of remote devices associated with the selected pathway.

19 Claims, 9 Drawing Sheets

Related U.S. Application Data

(60) Provisional application No. 62/803,012, filed on Feb. 8, 2019.

(51) Int. Cl.
*G06N 20/00* (2019.01)
*H04W 12/06* (2021.01)

(56) References Cited

U.S. PATENT DOCUMENTS

| | | |
|---|---|---|
| 8,589,249 B2 | 11/2013 | Campbell |
| 8,694,386 B1 | 4/2014 | Scherer et al. |
| 9,159,198 B2 | 10/2015 | Moshal et al. |
| 10,432,618 B1 * | 10/2019 | Poder .................. H04L 63/0861 |
| 10,559,030 B2 | 2/2020 | Friedman |
| 10,581,795 B2 | 3/2020 | Agarwal et al. |
| 10,586,073 B1 | 3/2020 | Armato |
| 10,621,635 B2 | 4/2020 | Vanguard |
| 2003/0163739 A1 * | 8/2003 | Armington ........... H04L 9/3226 |
| | | 713/186 |
| 2006/0021003 A1 * | 1/2006 | Fisher .................. H04L 63/0861 |
| | | 726/1 |
| 2008/0159299 A1 * | 7/2008 | Bu ...................... H04L 63/0823 |
| | | 370/400 |
| 2009/0054153 A1 | 2/2009 | Abekasis |
| 2012/0246483 A1 * | 9/2012 | Raisch .................. H04L 9/3297 |
| | | 713/178 |
| 2017/0039890 A1 * | 2/2017 | Truong ................ G09B 19/167 |
| 2017/0270749 A1 | 9/2017 | Hsu |
| 2019/0109820 A1 * | 4/2019 | Clark .................... H04L 9/0861 |
| 2019/0349426 A1 | 11/2019 | Smith et al. |
| 2020/0014619 A1 | 1/2020 | Shelar et al. |
| 2020/0027109 A1 | 1/2020 | Glasgow |
| 2020/0034401 A1 | 1/2020 | Scannell, Jr. |

\* cited by examiner

SYSTEM AND METHOD FOR SELECTING AN ELECTRONIC COMMUNICATION PATHWAY FROM A POOL OF POTENTIAL PATHWAYS

CROSS-REFERENCE TO RELATED APPLICATIONS

This application is a continuation in part of U.S. Nonprovisional application Ser. No. 16/777,236, filed on Jan. 30, 2020 and entitled "A SYSTEM AND METHOD FOR SELECTING AN ELECTRONIC COMMUNICATION PATHWAY FROM A POOL OF POTENTIAL PATHWAYS," which claims priority to provisional application No. 62/803,012 filed on Feb. 8, 2019 and entitled "A SYSTEM AND METHOD FOR RANDOMLY SELECTING AN ELECTRONIC COMMUNICATION PATHWAY FROM A POOL OF POTENTIAL PATHWAYS." Each of U.S. Nonprovisional application Ser. No. 16/777,236 and provisional application No. 62/803,012 is incorporated herein by reference.

FIELD OF THE INVENTION

The present invention generally relates to the field of network communication. In particular, the present invention is directed to a system and method for selecting an electronic communication pathway from a pool of potential pathways.

BACKGROUND

The Internet presents a plethora of potential communication routes between devices, and thus the users of those devices. The near-infinite possibilities present a steadily broadening field of both opportunities and challenges. One challenge among many is how direct communications, such as communications conferring rights to items of remunerative value, in a manner that is equitable while protecting the privacy and well-being of potential recipients and preventing those same potential recipients from diverting the communication through deceptive means. While many solutions to this and related challenges have been presented, none solves the underlying problem in a completely satisfactory manner.

SUMMARY OF THE DISCLOSURE

In an aspect, a system for selecting an electronic communication pathway from a pool of potential pathways includes at least a server. System includes a network communication routing hub operating on the at least a server, wherein the network communication routing hub is configured to identify a plurality of electronic communication pathways, wherein identifying the plurality of electronic communication pathways further includes receiving a plurality of incoming communications from a plurality of remote devices, wherein each remote device of the plurality of remote devices is connected to the network communication routing hub by an electronic communication pathway, and each incoming communication of the plurality of communications contains a subject indicator linking the communication to the pool of potential pathways. System includes an authentication module operating on the at least a server, wherein the authentication module is configured to authenticate each device of the plurality of remote devices, wherein authenticating each device further includes determining at least a verification element for each remote device of the plurality of remote devices, wherein each verification element of the plurality of verification elements is further configured to include either at least an authentication datum of each remote device of the plurality of remote devices or at least a failed authentication datum of each remote device of the plurality of remote devices and transmit the at least a verification element to each device of the plurality of remote devices. System includes a pathway selection module operating on the at least a server, wherein the pathway selection module is configured to select based on a pathway probability variable a pathway from the plurality of electronic communication pathways, wherein the pathway probability variable operates as a function of a pathway selection algorithm, wherein the pathway selection algorithm is further configured to determine the pathway probability variable as a function of at least a seed value as a function of each remote device and the subject indicator, transmit a first outgoing communication over the selected pathway to a remote device of the plurality of remote devices associated with the selected pathway, and transmit a second outgoing communication over the non-selected pathways to the remaining remote devices of the plurality of remote devices.

In another aspect, a method for selecting an electronic communication pathway from a pool of potential pathways is provided. The method includes identifying, by a network communication routing hub operating on the at least a server, a plurality of electronic communication pathways, wherein identifying the plurality of electronic communication pathways further includes receiving a plurality of incoming communications from a plurality of remote devices, wherein each remote device of the plurality of remote devices is connected to the network communication routing hub by an electronic communication pathway and each incoming communication of the plurality of communications contains a subject indicator linking the communication to the pool of potential pathways. The method includes authenticating, by an authentication module operating on the at least a server, each device of the plurality of remote devices wherein authenticating each device further includes determining at least a verification element of each device of the plurality of remote devices, wherein the verification element is further configured to include either at least an authentication datum of each remote device of the plurality of remote devices or at least a failed authentication datum of each remote device of the plurality of remote devices and transmitting the at least a verification element to each device of the plurality of remote devices. The method includes selecting, by a pathway selection module operating on the at least a server, based on a pathway probability variable a pathway from the plurality of electronic communication pathways, wherein the pathway probability variable operates as a function of a pathway selection algorithm, wherein the pathway selection algorithm includes determining the pathway probability variable as a function of at least a seed value as a function of each remote device and the subject indicator. The method includes transmitting, by a pathway selection module operating on at least a server, a first outgoing communication over the selected pathway to a remote device of the plurality of remote devices associated with the selected pathway. The method includes transmitting, by a pathway selection module operating on at least a server, a second outgoing communication over the non-selected pathways to the remaining remote devices of the plurality of remote devices.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure are directed to systems and methods for assigning a path on which to convey an outgoing communication using a selection process. Selection may be made from a pool of potential recipient devices that have conveyed previous communications linking each potential recipient device to a subject of the outgoing communication, which may include, for instance, the disbursal or shipment of an item of value; the recipient device may convey multiple communications linking each potential device to a subject of the outgoing communication correlating to the probability of selection for the recipient device; the pool may be filtered to eliminate duplication of users, devices that fail authentication measures, and other checks to ensure that the selection process is not subject to numerical bias or manipulation by potential adversaries.

Figure 1:
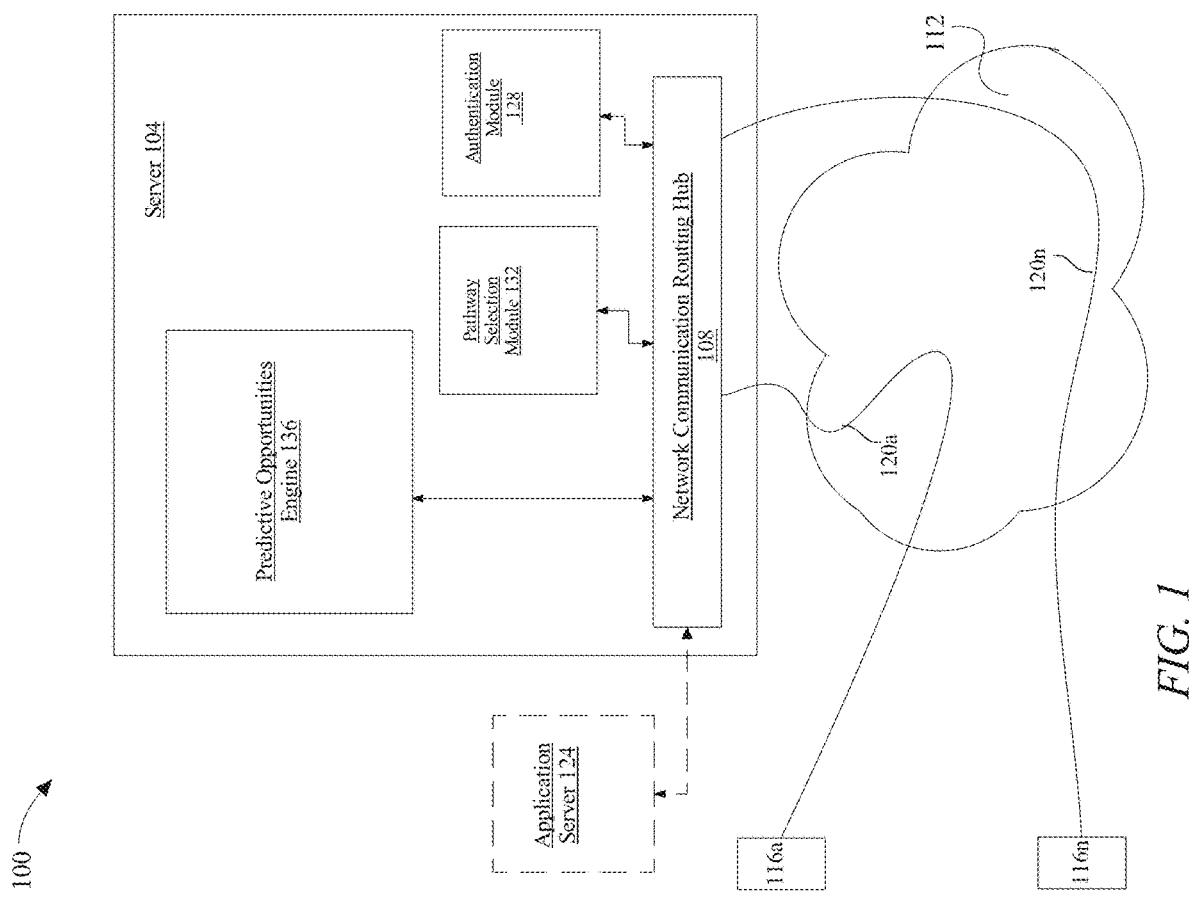
FIG. 1 is a high-level block diagram illustrating an exemplary embodiment of a system for selecting an electronic communication pathway from a pool of potential pathways.

Referring now to FIG. 1 an exemplary embodiment of a system 100 for selecting an electronic communication pathway from a pool of potential pathways is illustrated. System 100 includes at least a server 104. At least a server 104 may include any computing device as described herein, including without limitation a microcontroller, microprocessor, digital signal processor (DSP) and/or system on a chip (SoC) as described herein. At least a server 104 may be housed with, may be incorporated in, or may incorporate one or more sensors of at least a sensor. Computing device may include, be included in, and/or communicate with a mobile device such as a mobile telephone or smartphone. At least a server 104 may include a single computing device operating independently, or may include two or more computing device operating in concert, in parallel, sequentially or the like; two or more computing devices may be included together in a single computing device or in two or more computing devices. At least a server 104 may communicate with one or more additional devices as described below in further detail via a network communication routing hub 108. Network communication routing hub 108 may be utilized for connecting the at least a server 104 to electronic communication network 112 as described below, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 104 may include but is not limited to, for example, a at least a server 104 or cluster of computing devices in a first location and a second computing device or cluster of computing devices in a second location. At least a server 104 may include one or more computing devices dedicated to data storage, security, distribution of traffic for load balancing, and the like. At least a server 104 may distribute one or more computing tasks as described below across a plurality of computing devices of computing device, which may operate in parallel, in series, redundantly, or in any other manner used for distribution of tasks or memory between computing devices. At least a server 104 may be implemented using a "shared nothing" architecture in which data is cached at the worker, in an embodiment, this may enable scalability of system 100 and/or computing device.

With continued reference to FIG. 1, at least a server 104 may be designed and/or configured to perform any method, method step, or sequence of method steps in any embodiment described in this disclosure, in any order and with any degree of repetition. For instance at least a server 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, server 104 may communicate with a network communication routing hub 108. Network communication routing hub 108 may include, without limitation a computing device, including any server as described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk. Network communication routing hub 108 may alternatively or additionally include a desktop computer, a handheld device or mobile device such as a smartphone or tablet, and/or a special purpose device; any such device may include or be included in network communication routing hub 108 where configured as set forth in further detail below. Network communication routing hub 108 may include two or more devices working in concert or in parallel; network communication routing hub 108 may include, for instance, a first server or cluster of servers in a first location and a second server or cluster of servers in a second location. Network communication routing hub 108 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Network communication routing hub 108 may include one or more computing devices dedicated to data storage, security, distribution of traffic for load balancing, and the like. Network communication routing hub 108 may distribute one or more computing tasks as described below across a plurality of computing devices of network communication routing hub 108, which may operate in parallel, in series, redundantly, or in any other manner used for distribution of tasks or memory between computing devices. Network communication routing hub 108 may be implemented using a "shared nothing" architecture in which data is cached at the worker; in an embodiment, this may enable scalability of system 100 and/or network communication routing hub 108. In an embodiment, network communication routing hub 108 may communicate locally or over a network to one or more remote devices to perform one or more embodiments of processes and/or process steps as disclosed in further detail below; communication may include, without limitation, communication with any other device as described herein.

Still referring to FIG. 1, network communication routing hub 104 may connect to an electronic communication network 112. Electronic communication network 112, may include any network as described below in reference to FIG. 9 for conveying communications between electronic devices and/or computing devices as described below in reference to FIG. 9; communications may be performed, without limitation, using packet-based communication protocols. Examples of packet-based communication protocols include, without limitation, transmission control protocol-internet protocol (TCP-IP), hypertext transfer protocol (HTTP), secure HTTP (HTTPS), or the like. Electronic communication network 108 may include, without limitation, a local area network (LAN), a wide area network (WAN), the Internet, or any other network as consistent with descriptions of a network as provided in this disclosure. Packets and/or electronic communications transmitted over electronic communication network 112 may be sent directly from one device to another via a wired or wireless transmission process or may be relayed through one or more intermediate devices including without limitation, models, routers, servers, and the like.

Continuing to refer to FIG. 1, network communication routing hub 108 may implement or utilize one or more aspects of a cryptographic system, for instance to authenticate devices and/or to protect communications and/or data as described in further detail below. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

Still viewing FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, network communication routing hub 108 may communicate, using electronic communication network 112, with a plurality of remote network devices 116a-n connected to electronic communication network 108. Each remote network device of the plurality of remote network devices 116a-n may include any computing device as described below in reference to FIG. 9, including without limitation any device suitable for use as electronic communication hub as described above. Each remote network device may include, without limitation, a mobile device, desktop device, or other terminal device permitting a person to interact with electronic communication network 112, network communication routing hub 108, and/or server 104 including without limitation by operation of a web browser or native application instantiating one or more user interfaces as directed, for instance, by server-side and/or client-side programs provided by network communication routing hub 108 in the form of a "website" or similar network-based application or suite of applications.

Still referring to FIG. 1, network communication routing hub 108 may connect to a plurality of remote network devices 116a-n via a plurality of electronic communication pathways 120a-n. An electronic communication pathway of the plurality of electronic network communication pathways may be identified to network communication routing hub 108 by a network address, which may be a network address identified according to TCP-IP; network address may include, without limitation, a uniform resource locator (URL). An electronic communication pathway of the plurality of electronic communication pathways 120a-n may have varying intermediary conduits or devices for particular communications; however, endpoints of electronic communication pathway between network communication routing hub 108 and a remote device, of the plurality of remote devices, connected to network communication routing hub 104 via the electronic communication pathway remain at the remote device and the network communication routing hub 108. Selection of an electronic communication pathway, for instance as set forth in further detail below, may therefore be made by reference to endpoints of the electronic communication pathway.

Still referring to FIG. 1, an electronic communication pathway of a plurality of electronic communication pathways 120a-n may include a plurality of incoming communications. Each incoming communication of a plurality of incoming communications may be received as a single transmission or in one or more separate transmissions, each of which may be preceded and/or followed by communications transmitted by network communication routing hub 104. Each incoming communication of the plurality of incoming communications may include, without limitation, any interface suitable for network communication routing hub 108 to communicate, using electronic communication network 112, with a plurality of remote network devices 116a-n connected to electronic communication network 108. Each incoming communication of the plurality of incoming communications may include, without limitation, any transfer of signs, signals, writing, images, sounds, data, or intelligence of any nature transmitted in whole or in part via a plurality of electronic communication pathways 120 a-n. Each incoming communication may include, without limitation, an audio communication, video communication, text communication, website communication, electronic mail communication, or other communication interface permitting each remote device of the plurality of remote network devices 116a-n to correspond with network communication hub 108.

With continued reference to FIG. 1, each incoming communication of the plurality of incoming communications includes at least a subject indicator. A subject indicator may include, without limitation, a numerical or other textual code associated in memory of network communication routing hub 108, application server 124, and/or server 104 with a subject of communication; wherein subject of communication includes an item of value to be distributed and/or with regards to which rights are being distributed, as set forth in further detail below, a code associated with a transaction whereby item of value and/or rights to item of value are to be distributed, as set forth in further detail below. Subject indicator may include a verbal description of a subject of communication, such as without limitation a name of an item of value, transaction; verbal description, which may include without limitation a name or title, may be linked to a subject in any manner suitable for linking a code to a subject as described above. Subject matter indicator may be included in an incoming communication by being typed into incoming communication, entered into a text-entry window as part of incoming communication, or the like; selection of a link or activation of one or more event handlers, forms, or the like by a remote device and/or a user of remote device may insert subject matter indicator in an incoming communication. As a non-limiting example, a user may navigate to a page associated with a transaction as described above, fill in a form or activate a button or the like, and cause the user and/or remote device operated by the user to transmit a communication network communication routing hub 108 including subject matter indicator; for instance, user may wish to attempt to acquire an item of value, may navigate to a page or other user interface indicating a transaction whereby item of value or rights thereto may be disbursed, and may post an entry indicating the user is entering the transaction, as described in further detail below.

In an embodiment, and continuing to refer to FIG. 1, network communication routing hub 108 is further configured to detect a terminal condition. A terminal condition is a condition under which network communication routing hub 108 ceases to add electronic communication pathways to a plurality of electronic communication pathways 120a-n; for instance incoming communications may continuously be received at network communication routing hub 108, such that identification of the plurality of electronic communication pathways 120a-n could take an arbitrarily long time and/or produce an arbitrarily large plurality of electronic communication pathways 120a-n. Terminal condition may identify one or more data concerning incoming communications, the plurality of electronic communication pathways 120a-n, or other circumstances related to system 100 indicating that selection of additional pathways for inclusion in the plurality of electronic communication pathways 120a-n should cease. Network communication routing hub 108 may thus identify the plurality of electronic communication pathways 120a-n based on the detection of terminal condition, for instance by determining that the terminal condition is met, and that electronic communication pathways already identified constitute a complete set of electronic communication pathways for the purposes of this embodiment of system 100.

Still referring to FIG. 1, detection of terminal condition may include determining that a threshold number of pathways have been selected as above; comparison to a threshold number may, for instance, include a comparison to maximal number after filtering or removal of inauthentic or duplicate entries as described above. As a further non-limiting example, each incoming communication may include a number, such as without limitation a number representing an amount paid by a user of a remote device; the numbers provided in incoming communications may be added together or otherwise aggregated, and the result compared to a threshold. For instance, and without limitation, where an embodiment of system 100 involves a process whereby an item of value or a right thereto is to be transferred to a user, each user may be prompted to deposit a share, such as without limitation an amount in a currency, into a "pot" for the item of value. Once a particular "pot" reaches "full," for instance when the sum of the payments or shares provided adds up to a threshold amount of currency such as a price for the item of value, application server 124, server 104 and/or network communication routing hub 108 may determine that the pot has reached maximum shareholders and the item of value and/or rights thereto may be disbursed, for instance as described in further detail below. In an embodiment, submissions of shares and/or payments may be non-refundable; thus, a user to whom the item of value is not transferred may lose the currency paid to enter the share. Different pots may have different tiers of prices for shares. As a non-limiting illustrative example, a pot for an electronic device having a $500 value, and a terminal condition associated with submitted shares adding up to that value, may be associated with a first pot option wherein each share is 50 Dollars; this pot may only fit 15 shareholders before it is "full" and a single shareholder takes the win for this product, creating a $1/15$ chance of receiving the item for each shareholder. Continuing the illustrative example in a second pot option each share may cost 20 Dollars; this pot may fit 40 shareholders before it is "full" and a single shareholder may receive the product as before, with each shareholder's probability of receipt at $1/40$. Further continuing the above-described example a third pot option may set the price per share at 5 Dollars. This pot may fit 150 shareholders before it is "full" and a single shareholder takes receives the product; each shareholder may have odds of receiving the product of $1/150$. The above-described examples are for illustrative purposes only, and the disclosure is not intended to be limited to these examples. Share prices may be fixed per "pot," or may vary per "pot"; in the latter case, for instance, a user's odds of receipt may be weighted according to a size of contribution. Persons skilled in the art, upon reviewing the entirety of this disclosure, will be aware of various alternative terminal conditions that may be applied in embodiments of system 100.

Continuing to refer to FIG. 1, in an embodiment, network communication routing hub 104 may convey communication from remote devices of a plurality of remote network devices 116*a-n* and an application server 124. Application server 124 may operate an application with regard to which communications performed according to methods described in this disclosure may be conveyed; for instance, application may generate communications regarding an item of value to be transferred, monetary value associated with the item of value, increments of monetary value, and/or terminal conditions for selection of the plurality of electronic communication pathways 120*a-n* as described in further detail below. An item of value may include any tangible or intangible unit of property, ranging for instance from $1.00 household items to automobiles & real estate. Application server 124 may include, be included in, or be identical to network communication routing hub 108; persons skilled in the art, upon reviewing the entirety of this disclosure, will be aware of various ways in which application server 124 and/or network communication routing hub 108 may inter-relate and/or communicate as consistent with this disclosure. Network communication routing hub 108 may be designed and configured to perform any method and/or method steps as described herein, including without limitation methods and/or method steps described in this disclosure, in any order or combination, or with any degree of iteration or repetition. For instance, and without limitation, network communication routing hub 108 may be designed and/or configured to identify a plurality of electronic communication pathways 120*a-n*, wherein identifying the plurality of electronic communication pathways 120*a-n* further comprises receiving a plurality of incoming communications from a plurality of remote network devices 116*a-n*, wherein each remote network device of the plurality of remote network devices 116*a-n* is connected to the network communication routing hub 108 by an electronic communication pathway and each incoming communication of the plurality of communications contains a subject indicator linking the communication to the pool of potential pathways, to authenticate each device of the plurality of remote network devices 116*a-n* to verify uniqueness of each user of the plurality of remote network devices 116*a-n*, to select a pathway from the plurality of electronic communication pathways 120*a-n*, to transmit a first outgoing communication over the selected pathway to a remote network device of the plurality of remote network devices 116*a-n* associated with the selected pathway, and/or to transmit a second outgoing communication over the non-selected pathways to the remaining remote network devices of the plurality of remote network devices 116*a-n* for instance as set forth in further detail below.

Continuing to refer to FIG. 1, network communication routing hub 108 may connect to at least an authentication module 128 executing on the at least a server 104. At least an authentication module 128 may include any suitable hardware or software. In an embodiment, at least an authentication module 128 is designed and configured to authenticate each device of the plurality of remote devices 116*a-n*. Authentication module 128 may determine at least a verification element of each device of the plurality of remote devices and transmit the verification element of each device to each device of the plurality of remote devices 116*a-n*. Each verification element of the plurality of verification elements may include at least an authentication datum of each remote device of the plurality of remote devices or at least a failed authentication datum of each remote device of the plurality of remote devices. At least a verification element may be determined including without limitation any process for determination as described in this disclosure. At least a verification element of each device may be transmitted to each remote device of the plurality of remote devices 116*a-n* via network communication routing hub 108 and electronic communication pathways 120*a-n*.

Each of the above processes may be performed utilizing pathway numeric verification unit, pathway age verification unit, and/or pathway biometric verification unit, as described in more detail below in FIGS. 4-6. In an embodiment, authentication module 128 may transmit the at least a verification element to each device of the plurality of remote devices 116*a-n* as described in more detail below. An exemplary embodiment of authentication module 128 is described in more detail below in reference to FIG. 4.

With continued reference to FIG. 1, network communication routing hub 108 may connect to pathway selection module 132 executing on the at least a server 104. Pathway selection module 132 may include any suitable hardware or software module. In an embodiment, pathway selection module 132 is designed and configured to select, based on a pathway probability variable, a pathway from the plurality of electronic communication pathways 120a-n, transmit a first outgoing communication over the selected pathway to a remote device of the plurality of remote devices 116a-n associated with the selected pathway, and transmit a second outgoing communication over the non-selected pathways to the remaining remote network devices of the plurality of remote network devices 116a-n. The pathway probability variable may include without limitation the weighted selection probability of each pathway of the plurality of electronic communication pathways 120a-n. Pathway probability variable may operate as a function of a pathway selection algorithm, for instance as described in this disclosure in reference to FIG. 7. First outgoing communication may, as a non-limiting example, inform a user associated with a selected electronic communication pathway that the user is a chosen recipient of an item of value or a right thereto. Second outgoing communication may, as a non-limiting example, inform users associated with selected electronic communication pathways that the users were not chosen as the recipient of an item of value or right thereto. Outgoing communication may include a link, code, or other event handler or element of data that a receiving user may be able to use to acquire item of value and/or right thereto. User may be required to submit authentication information again; authentication module 128 and/or network communication routing hub 108 may authenticate remote device and/or user a second time prior to conveying item and/or right thereto to user. Conveyance may include, without limitation, sending via mail or parcel service, transmitting intangible property and/or a code, document, or other element of data redeemable for tangible property via electronic means, or any other suitable form of conveyance that may occur to a user skilled in the art upon reviewing the entirety of this disclosure.

Still viewing FIG. 1, each of the above processes may be performed utilizing machine learning processes, and/or the pathway probability algorithm operating on pathway selection module 132, as described in more detail below in FIG. 7. In an embodiment, the pathway probability algorithm is configured to determine pathway probability variable based on the incoming communication of the plurality of incoming communications as a function of each remote device and the subject indicator and update the pathway probability variable based on the pathway selection algorithm. An exemplary embodiment of the pathway probability algorithm is described in more detail below in reference to FIG. 7.

Still referring to FIG. 1, system 100 includes a predictive opportunities engine 136 operating on the at least a server 104, wherein the predictive opportunities engine 136 is configured to receive at least a least a first training set and an incoming communication of the plurality of incoming communications from each remote device of the plurality of remote devices 116a-n and generate at least a compatible output. At least a server 104, predictive opportunities engine 136, and/or one or more modules operating thereon may be designed and/or configured to perform any method, method step, or sequence of method steps in any embodiment described in this disclosure, in any order and with any degree of repetition. For instance, at least a server 104 and/or predictive opportunities engine 136 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 104 and/or predictive opportunities engine 136 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
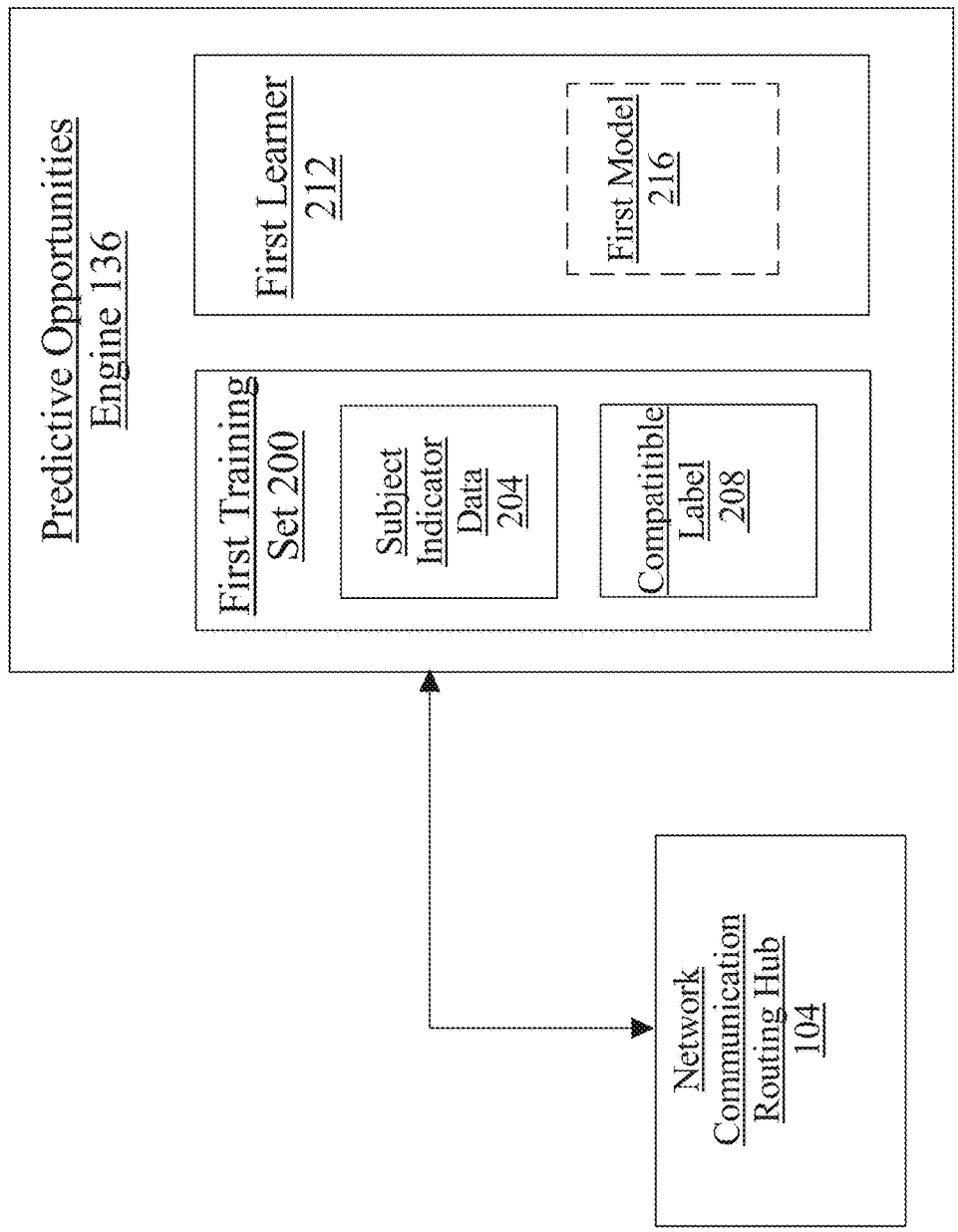
FIG. 2 is a schematic diagram illustrating an exemplary embodiment of a predictive opportunities engine and associated system elements.

Referring now to FIG. 2, at least a server 104 and/or pathway opportunities engine 136 may be designed and configured to receive training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 2, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like;

categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of an item of value may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 2, categorization device may be configured to receive a first training set 200 including a plurality of first data entries, each first data entry of the first training set 200 including at least an element of subject indicator data 204 and at least a correlated compatible label 208. At least an element of subject indicator data 204 may include any data indicative of any identifying a subject of communication; wherein subject of communication includes an item of value to be distributed and/or with regards to which rights are being distributed, item of value may include any tangible or intangible unit of property, as described above in reference to FIG. 1. Subject indicator data 204 may include a singular item of value and/or a grouping of multiple items of value.

Subject indicator data 204 may include, without limitation, identifying data for items ranging from a $1.00 household item to real estate. Subject indicator data 204 may include, without limitation, identifying data for an option for an overnight trip, such as an overnight trip to Alaska, which may include a flight, dining, lodging, and/or an excursion. Subject indicator data 204 may include identifying data for a voucher, such as a gift card, which may include a disclosed or undisclosed value, such as an exchange for a particular good or service.

Continuing to refer to FIG. 2, each element of first training set 200 includes at least a compatible label 208. A compatible label, as described herein, is an element of data identifying and/or describing a current, incipient, or future subject indicator of interest to a person; subject indicator may include a subject of communication; wherein subject of communication includes an item of value to be distributed and/or with regards to which rights are being distributed, item of value may include any tangible or intangible unit of property, as described above in reference to FIG. 1. At least a compatible label may be associated with a singular subject indicator or a grouping of items of value that may be associated with one or more elements of subject indicator data 204 as described in further detail below. Items of value associated with compatible labels may include, without limitation, one or more goods and/or services. Items of value associated with compatible labels may include, without limitation, one or more technology products or services, including without limitation cell phones, laptops, computers, tablets, smart phones, charging cables, televisions, radios, mp3 players, electronic book readers, video game consoles, virtual reality headsets, software, programming training, technical support, streaming subscriptions, virtual assistants, website building, or the like. Compatible labels may be associated with one or more housewares products or services, including without limitation pots, pants, dishes, flatware, cooking utensils, tablecloth, placemats, glassware, towels, shower curtains, rugs, bathmats, sheets, pillowcases, blankets, mattress pads, curtains, mirrors, wall hangings, shoe racks, jewelry boxes, clocks, candles, lamps, couches, chairs, dining table, desks, fans, or the like. Compatible labels may be associated with one or more small appliances including without limitation blender, coffee pot, microwave, toaster, toaster oven, panini press, waffle maker, crock pot, bread makers, can openers, electric toothbrushes, hair dryers, digital scales, waterproof radio, space heaters, food processor, rice cookers, juicers, alarm clocks, or the like. Compatibility labels may be associated with one or more large appliances including without limitation refrigerator, freezer, convection oven, grill, washing machine and dryer, kitchen stove, water heaters, and the like. Compatible labels may be associated with one or more leisure services including without limitation massage parlors, manicurists, facialists, water sport activities, guided excursions, sporting activities, concerts, museums, monuments, guided tours, car rentals, shopping trips, personal training, or the like. Compatible labels may be associated with one or more clothing products or services including without limitation tailoring, pants, dresses, special occasion styling, shoes, custom designing, clothing subscription services, dry cleaning services, t-shirts, handbags, and the like. Compatible labels may be associated with one or more healthcare products or services including without limitation cosmetic procedures, genetic testing, nutritional supplements, blood pressure monitors, fever thermometers, blood glucose monitors, dietician services, over-the-counter medication, screening tests for diseases; such as heart disease, colon cancer, and/or the like, personal-care items, in-home senior care, marriage counselor services, chiropractor services, and/or the like.

Compatible labels may include items for which a person may have determined an arbitrary value, such as a person who has created an item; for instance, a person may be an artist and specialize in portraits, the item of value associated with compatible labels may be an individualized self-portrait. The above-described examples are presented for illustrative purposes only and are not intended to be exhaustive. Persons skilled in the art, upon reviewing the entirety of this disclosure, will be aware of various additional examples of conditions that may be associated with prognostic labels as described in this disclosure.

Still referring to FIG. 2, at least a compatible label may be stored in any suitable data and/or data type. For instance, and without limitation, at least a compatible label may include textual data, such as numerical, character, and/or string data. Textual data may include a standardized name and/or code for an item, product, service, goods or the like; codes may include without limitation, manufacturing codes, production codes, selling codes, RDIF codes, which may include without limitation codes used in classification systems such as Global Product Classification (GPC) standards. In general, there is no limitation on forms textual data or non-textual data used as at least a compatible label may take; persons skilled in the art, upon reviewing the entirety of this disclosure, will be aware of various forms which may be suitable for use as at least a compatible label consistently with this disclosure.

With continued reference to FIG. 2, at least a compatible label 208 may be stored as image data, such as for example an image of a particular product such as a photograph of a particular sunscreen product or an image of a particular book. Image data may be stored in various forms including for example, joint photographic experts group (JPEG), exchangeable image file format (Exif), tagged image file format (TIFF), graphics interchange format (GIF), portable network graphics (PNG), netpbm format, portable bitmap (PBM), portable any map (PNM), high efficiency image file format (HEIF), still picture interchange file format (SPIFF), better portable graphics (BPG), drawn filed, enhanced compression wavelet (ECW), flexible image transport system (FITS), free lossless image format (FLIF), graphics environment manage (GEM), portable arbitrary map (PAM), personal computer exchange (PCX), progressive graphics file (PGF), gerber formats, 2 dimensional vector formats, 3 dimensional vector formats, compound formats including both pixel and vector data such as encapsulated postscript (EPS), portable document format (PDF), and stereo formats.

With continued reference to FIG. 2, in each first data element of first training set 200, at least an element of subject indicator data 204 is correlated with a compatible label 208 where the element of subject indicator data is located in the same data element and/or portion of data element as the compatible label 208; for example, and without limitation, an element of subject indicator data is correlated with a correlated element where both element of subject indicator data and correlated element are contained within the same first data element of the first training set. As a further example, an element of subject indicator data is correlated with a correlated element where both share a category label as described in further detail below, where each is within a certain distance of the other within an ordered collection of data in data element, or the like. Still further, an element of subject indicator data may be correlated with a correlated element where the element of subject indicator data and the correlated element share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between subject indicator data 204 and compatible label 208 that may exist in first training set 200 and/or first data element consistently with this disclosure.

In an embodiment, and still referring to FIG. 2, predictive opportunities engine 136 may be designed and configured to associate at least an element of subject indicator data 204 with at least a category from a list of significant categories of subject indicator data 204. Significant categories of subject indicator data 204 may include labels and/or descriptors describing types of subject indicator data 204 that are identified as being of high relevance in identifying compatible labels. As a non-limiting example, one or more categories may identify significant categories of subject indicator data 204 based on degree of relevance to one or more product specifications and/or within one or more industry, which may include without limitation industries listed in classification systems such as North American Industry Classification System (NAICS). For instance, and without limitation, a particular product, good, and/or service may be recognized in a given industry as complimentary of various products, good, and/or service within a relevant field. As a non-limiting example, and without limitation, subject indicator data describing sneakers, such as running sneakers, tennis shoes, cleats, and/or other performance shoes may be recognized as useful for identifying various products, goods, and/or services such as socks, massage therapists, physical therapists, personal trainers, athletic clothing, and/or nutritional supplements. As an additional example, subject indicator data describing a beach accessories, such as beach towels, umbrellas, chairs may be useful in selecting compatible label 208 that include products, goods, and/or services such as sunscreen, coolers, hats, floatation devices, yard games, water sport activities, sailing lessons, boat rentals, kayaks, and/or tanning services. Similarly, snow sport equipment, such as skis, snowboards, snowshoes, snowmobile and/or other snow sport apparatus may be recognized as useful in identifying products, goods and/or services such as lift tickets, lodging, winter outdoor excursions, local food vouchers, rental vouchers, snow sport lessons, hand warmers, winter apparel, gloves, hats, and/or other winter accessories. Persons skilled in the art, upon reviewing the entirety of this disclosure, will be aware of various additional categories of subject indicator data that may be used consistently with this disclosure.

Continuing to refer to FIG. 2, whether an entry indicating significance of a category of subject indicator data and/or a given relationship of such categories to compatible labels, an entry or entries may be aggregated to indicate an overall degree of significance. For instance, each category of subject indicator data, relationship of such categories to compatible labels, and/or category of compatible labels may be given an overall significance score; overall significance score may, for instance, be incremented each time an expert submission and/or paper indicates significance as described above. Persons skilled in the art, upon reviewing the entirety of this disclosure will be aware of other ways in which scores may be generated using a plurality of entries, including averaging, weighted averaging, normalization, and the like. Significance scores may be ranked; that is, all categories of subject indicator data, relationships of such categories to compatible labels, and/or categories of compatible labels may be ranked according significance scores, for instance by ranking categories of subject indicator data, relationships of such categories to compatible labels, and/or categories of compatible labels higher according to higher significance scores and lower according to lower significance scores. Categories of subject indicator data, relationships of such categories to compatible labels, and/or categories of compatible labels may be eliminated from current use if they fail a threshold comparison, which may include a comparison of significance score to a threshold number, a requirement that significance score belong to a given portion of ranking such as a threshold percentile, quartile, or number of top-ranked scores. Significance scores may be used to filter outputs as described in further detail below; for instance, where a number of outputs are generated and automated selection of a smaller number of outputs is desired, outputs corresponding to higher significance scores may be identified as more probable and/or selected for presentation while other outputs corresponding to lower significance scores may be eliminated.

Still referring to FIG. 2, predictive opportunities engine 136 may detect further significant categories of subject indicator data, relationships of such categories to compatible labels, and/or categories of compatible labels using machine-learning processes, including without limitation unsupervised machine-learning processes as described in further detail below; such newly identified categories may be added to pre-populated lists of categories as described above.

Continuing to refer to FIG. 2, in an embodiment, predictive opportunities engine 136 may be configured, for instance as part of receiving the first training set 200, to associate at least correlated compatible label 208 with at least a category from a list of significant categories of compatible labels. Significant categories of compatible labels may be acquired, determined, and/or ranked as described above. As a non-limiting example, compatible labels may be organized according to relevance to and/or association with a list of significant products, goods and/or services. A list of significant products, goods, and/or services may include, without limitation, products, goods, and/or services having generally acknowledged correlation with office spaces; this may be determined, as a non-limiting example, by a product of relative frequency of a good, service, and/or product being associated with an office space, such as use, affiliated purchases, similarity, and the like. within the population with years of life and/or years of able-bodied existence lost, on average, as a result of the condition. A list of products, goods, and/or services may be modified for a given person, without limitation, to reflect a current financial status; for instance, a person with a significant amount of wealth, such as a fixed income, significant preservation of funds, diverse investment portfolio, and the like, may have a higher probability of interest in such products, goods, and/or services than a typical person from the general population, and as a result predictive opportunities engine 136 may modify list of significant categories to reflect this difference.

With continued reference to FIG. 2, predictive opportunities engine 136 may include a first label learner 212 operating on the predictive opportunities engine 136, the first label learner 212 designed and configured to generate the at least a compatible output as a function of the first training set 200 and the at least an incoming communication of the plurality of incoming communications. First label learner 212 may include any hardware and/or software module. First label learner 212 is designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 2, first label learner 212 may be designed and configured to generate at least a compatible output by creating at least a first machine-learning model 216 relating subject indicator data 204 to compatible labels 208 using the first training set 200 and generating the at least a compatible output using the first machine-learning model 216; at least a first machine-learning model 216 may include one or more models that determine a mathematical relationship between subject indicator data 204 and compatible labels 208. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithm used to generate first machine-learning model 216 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, first label learner 212 may generate compatible output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using first training set 200; the trained network may then be used to apply detected relationships between elements of subject indicator data 204 and compatible labels 208.

Figure 3:
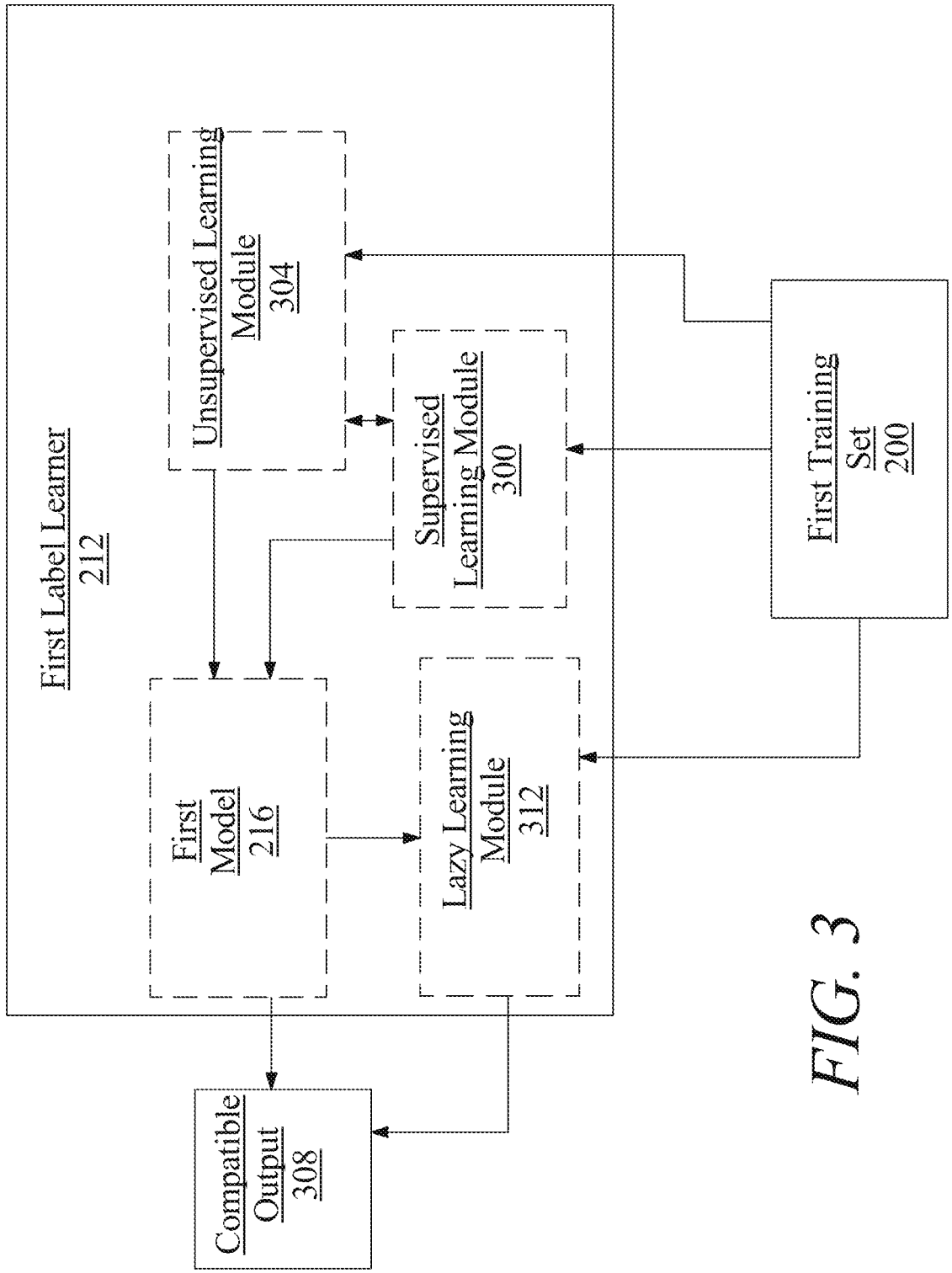
FIG. 3 is a block diagram illustrating an exemplary embodiment of a first label learner and associated system elements.

Referring now to FIG. 3, an exemplary embodiment of first label learner is illustrated. Machine-learning algorithms used by first label learner 212 may include supervised machine-learning algorithms, which may, as a non-limiting example be executed using a supervised learning module 300 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use elements of subject indicator data as inputs, compatible label 208 as outputs, and a scoring function representing a desired form of relationship to be detected between elements of subject indicator data and compatible label 208; scoring function may, for instance, seek to maximize the probability that a given element of subject indicator data and/or combination of elements of subject indictor data is associated with a given compatible label 208 and/or combination of compatible label 208 to minimize the probability that a given element of subject indictor data and/or combination of elements of subject indictor data is not associated with a given compatible label 208 and/or combination of compatible label 208. Scoring function may be expressed as a risk function representing an "expected loss" of an algorithm relating inputs to outputs, where loss is computed as an error function representing a degree to which a prediction generated by the relation is incorrect when compared to a given input-output pair provided in first training set. Persons skilled in the art, upon reviewing the entirety of this disclosure, will be aware of various possible variations of supervised machine learning algorithms that may be used to determine relation between elements of subject indictor data and compatible label 208. In an embodiment, one or more supervised machine-learning algorithms may be restricted to a particular domain for instance, a supervised machine-learning process may be performed with respect to a given set of parameters and/or categories of parameters that have been suspected to be related to a given set of compatible label 208, and/or are specified as linked to a consumer good and/or industry covering a particular set of compatible label 208. As a non-limiting example, a particular set of accessories or services may be typically used in conjunction with a distinct item of technology, and a supervised machine-learning process may be performed to relate those particular accessories and/or services to the distinct item of technology and correlated compatible products; in an embodiment, domain restrictions of supervised machine-learning procedures may improve accuracy of resulting models by ignoring artifacts in training data. Domain restrictions may be suggested by experts and/or deduced from known purposes for particular evaluations and/or known tests used to evaluate compatible label 208. Additional supervised learning processes may be performed without domain restrictions to detect, for instance, previously unknown and/or unsuspected relationships between physiological data and compatible label 208.

With continued reference to FIG. 3, machine-learning algorithms may include unsupervised processes; unsupervised processes may, as a non-limiting example, be executed by an unsupervised learning module 304 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, first label learner 212 and/or at least a server 104 may perform an unsupervised machine learning process on first training set, which may cluster data of first training set 200 according to detected relationships between elements of the first training set, including without limitation correlations of elements of subject indictor data to each other and correlations of compatible label 208 to each other; such relations may then be combined with supervised machine learning results to add new criteria for first label learner 212 to apply in relating compatible output to compatible label 208. As a non-limiting, illustrative example, an unsupervised process may determine that a first element of subject indictor data acquired in an incoming communication correlates closely with a second element of subject indicator data, where the first element has been linked via supervised learning processes to a given compatible label 208, but the second has not; for instance, the second element may not have been defined as an input for the supervised learning process, or may pertain to a domain outside of a domain limitation for the supervised learning process. Continuing the example a close correlation between first element of subject indictor data and second element of subject indictor data may indicate that the second element is also a good predictor for the compatible label 208; second element may be included in a new supervised process to derive a relationship or may be used as a synonym or proxy for the first subject indictor data element by first label learner 212.

Still referring to FIG. 3, at least a server 104 and/or first label learner 132 may detect further significant categories of subject indictor data, relationships of such categories to compatible label 208, and/or categories of compatible label 208 using machine-learning processes, including without limitation unsupervised machine-learning processes as described above; such newly identified categories, may be added to pre-populated lists of categories, as described above. In an embodiment, as additional data is added to system 100, first label learner 212 and/or at least a server 104 may continuously or iteratively perform unsupervised machine-learning processes to detect relationships between different elements of the added and/or overall data; in an embodiment, this may enable system 100 to use detected relationships to discover new correlations between known consumer goods and services, and/or compatible label 208 and one or more elements of data in large bodies of data, such as product properties, product specifications, offering description-related data, enabling future supervised learning and/or lazy learning processes as described in further detail below to identify relationships between, e.g., particular clusters of household products and services and particular compatible label 208 and/or suitable compatible label 208.

Use of unsupervised learning may greatly enhance the accuracy and detail with which system may detect compatible label 208.

With continued reference to FIG. 3, unsupervised processes may be subjected to domain limitations. For instance, and without limitation, an unsupervised process may be performed regarding a comprehensive set of data regarding one person, such as a comprehensive user profile, search history, user subject indicator history, and/or personal data such as social media profiles, location data, billing statements and/or other data concerning that persons. As another non-limiting example, an unsupervised process may be performed on data concerning a particular cohort of persons; cohort may include, without limitation, a demographic group such as a group of people having a shared age range, ethnic background, nationality, sex, and/or gender. Cohort may include, without limitation, a group of people having a shared value for an element and/or category of subject indicator data, a group of people having a shared value for an element and/or category of compatible label 208; as illustrative examples, cohort could include all people having an allergy to cotton, all people over the age of 65, all people of Italian descent, or the like. Persons skilled in the art, upon reviewing the entirety of this disclosure, will be aware of a multiplicity of ways in which cohorts and/or other sets of data may be defined and/or limited for a particular unsupervised learning process.

Still referring to FIG. 3, first label learner 212 may alternatively or additionally be designed and configured to generate at least a compatible output 308 by executing a lazy learning process as a function of the first training set 212 and/or at least a subject indicator; lazy learning processes may be performed by a lazy learning module 312 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a compatible label 208 associated with a particular consumer good or service, using first training set. As a non-limiting example, an initial heuristic may include a ranking of compatible label 208 according to relation to a service type of at least a particular service sample, one or more categories of subject indicator data identified in service type of at least a particular service sample, and/or one or more values detected in at least a specific service sample; ranking may include, without limitation, ranking according to significance scores of associations between elements of subject indicator data and compatible label 208, for instance as calculated as described above. Heuristic may include selecting some number of highest-ranking associations and/or compatible label 208. First label learner 212 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate compatible outputs 808 as described in this disclosure, including without limitation lazy learning applications of machine-learning algorithms as described in further detail below.

Figure 4:
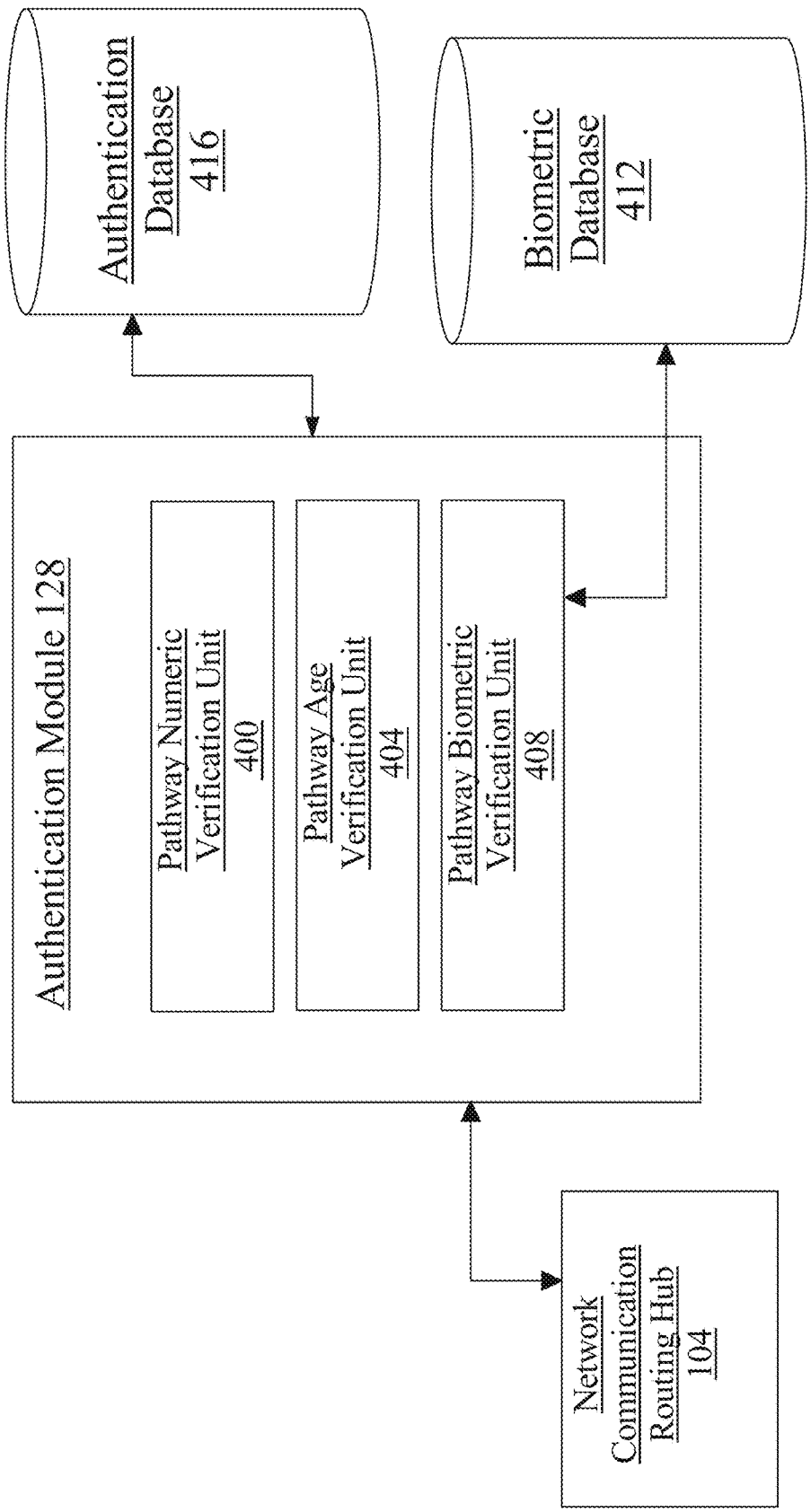
FIG. 4 is a schematic diagram illustrating an exemplary embodiment of an authentication module and associated system components.

Referring now to FIG. 4, an exemplary embodiment of an authentication module 128, as pictured in FIG. 1 is illustrated in detail. Authentication module 128 may include any suitable hardware or software module. Authentication module 128 includes pathway numeric verification unit 400. Pathway numeric verification unit 400 may be configured to perform pathway numeric verification of each device of the plurality of remote devices 116*a-n*. Pathway numeric verification may include validating the user's financial ability to participate in an embodiment of system 100 and/or a transaction as described herein for a transfer of an item of value and/or rights thereto is assessed; ability to participate may include ability to absorb losses from participation in transactions. Validation may include any process whereby a user's financial ability to participate in an embodiment of system 100 and/or a transaction as described herein for a transfer of an item of value and/or rights thereto is assessed; ability to participate may include ability to absorb losses from participation in transactions. Pathway numeric verification may include a credit check or check of a user's consumer report, a check of one or more account balances of accounts as provided by user, verification of income or assets, or the like. Pathway numeric verification may include a check against a limit of transactions a user may participate in per time period; for instance, user may be forbidden to participate in more than some threshold number of transactions per day, week, month, and/or year. Threshold and/or limit may be user-specific; for instance, a user with lower income or a lower credit score may have a lower threshold number, while a user with superior credit, a high income, or more assets may have a higher threshold number. Threshold may be applied to number of participations, or to number of losses, as described in further detail below. Pathway numeric verification unit 400 may include updating the at least a verification element of each device of the plurality of remote devices 116*a-n*. Updating the verification element may include transmitting the authentication datum or failed authentication datum to each remote device of the plurality of remote devices 116*a-n* through network communication hub 108, as described above. For instance, and without limitation, one or more pathway numeric verification described above determined a user unable to participate in a particular transaction; the verification element of the user's remote device of the plurality of remote devices 116*a-n* would update to contain an element of failed authentication datum. In an embodiment, use of pathway numeric verification may prevent users from harming themselves financially, for instance due to addictive behavior.

With continued reference to FIG. 4, authentication module 128 includes pathway age verification unit 404 configured to perform pathway age verification of each remote device of the plurality of remote devices 116*a-n*. Pathway age verification is configured to receive the user's birth datum to determine if the user surpasses at least a threshold age, such as a minimum age requirement to participate in an embodiment of system 100 and/or a transaction as described herein for a transfer of an item of value and/or rights thereto is assessed; ability to participate may include verifying the user is over the age of 18. Threshold age and/or lower age limit may be subject indicator specific; for instance, a product, good, or service containing explicit content may have a higher threshold age, while a product, good, or service containing adolescent targeted content may have a lower threshold age. Pathway age verification may include comparison of the threshold age to, without limitation, user's birth datum, such as without limitation user input of the user's date of birth, user's date of birth connected to a social medial profile, user's date of birth associated with a connected bank account, and the like. Pathway age verification unit 404 may include updating the at least a verification element of each device of the plurality of remote devices 116*a-n*. Updating the verification element may include transmitting the authentication datum or failed authentication datum to each remote device of the plurality of remote devices 116*a-n* through network communication hub 108, as described above. For instance, and without limitation, pathway age verification determined a user's age to be below the threshold for a particular subject indicator causing the user to be unable participate in the particular transaction; the verification element of the user's remote device of the plurality of remote devices 116*a-n* would update to contain an element of failed authentication datum. In an embodiment, use of pathway age verification may prevent users under the age of 18 from accessing inappropriate content, for instance due to sexually explicit content.

Still referring to FIG. 4, authentication module 128 includes pathway biometric verification unit 408 configured to perform pathway biometric verification of each device of the plurality of remote devices 116*a-n* to participate in an embodiment of system 100 and/or a transaction as described herein for a transfer of an item of value and/or rights thereto is assessed; ability to participate may include verifying the identity of the user. Pathway biometric verification is configured to receive at least a biometric datum from each device of the plurality of remote devices 116*a-n* and match the at least a biometric datum for each remote device of the plurality of remote devices 116*a-n* to a correlated biometric datum stored within biometric database 412. Authentication module 128 may include or communicate with biometric database 412. Biometric database 412 may be implemented as any database and/or datastore suitable for use as a biometric database. An exemplary embodiment of a biometric database 412 is provided below in FIG. 5. Biometric datum may include, without limitation, any body measurement or calculation, such as physiological characteristics and/or behavioral characteristics. In an embodiment, without limitation, a biometric datum may include without limitation fingerprint, palm veins, face recognition, DNA, palm print, hand geometry, iris recognition, retina, odor/scent, typing rhythm, gait, voice, and the like. Persons skilled in the art, upon reviewing the entirety of this disclosure, will be aware of various additional examples for biometric datum that may be received from each remote device of the plurality of remote devices consistently with this disclosure.

Continuing to refer to FIG. 4, pathway biometric verification unit 408 may include updating the at least a verification element of each device of the plurality of remote devices 116*a-n*. Updating the verification element may include transmitting the authentication datum or failed authentication datum to each remote device of the plurality of remote devices 116*a-n* through network communication hub 108, as described above. For instance, and without limitation, fingerprint scan data determined the user was not the authenticated user for the selected remote device of the plurality of remote devices 116*a-n* causing the selected remote device to be unable to participate in a particular transaction; the verification element of the user's remote device of the plurality of remote devices 116*a-n* would update to contain an element of failed authentication datum.

Figure 5:
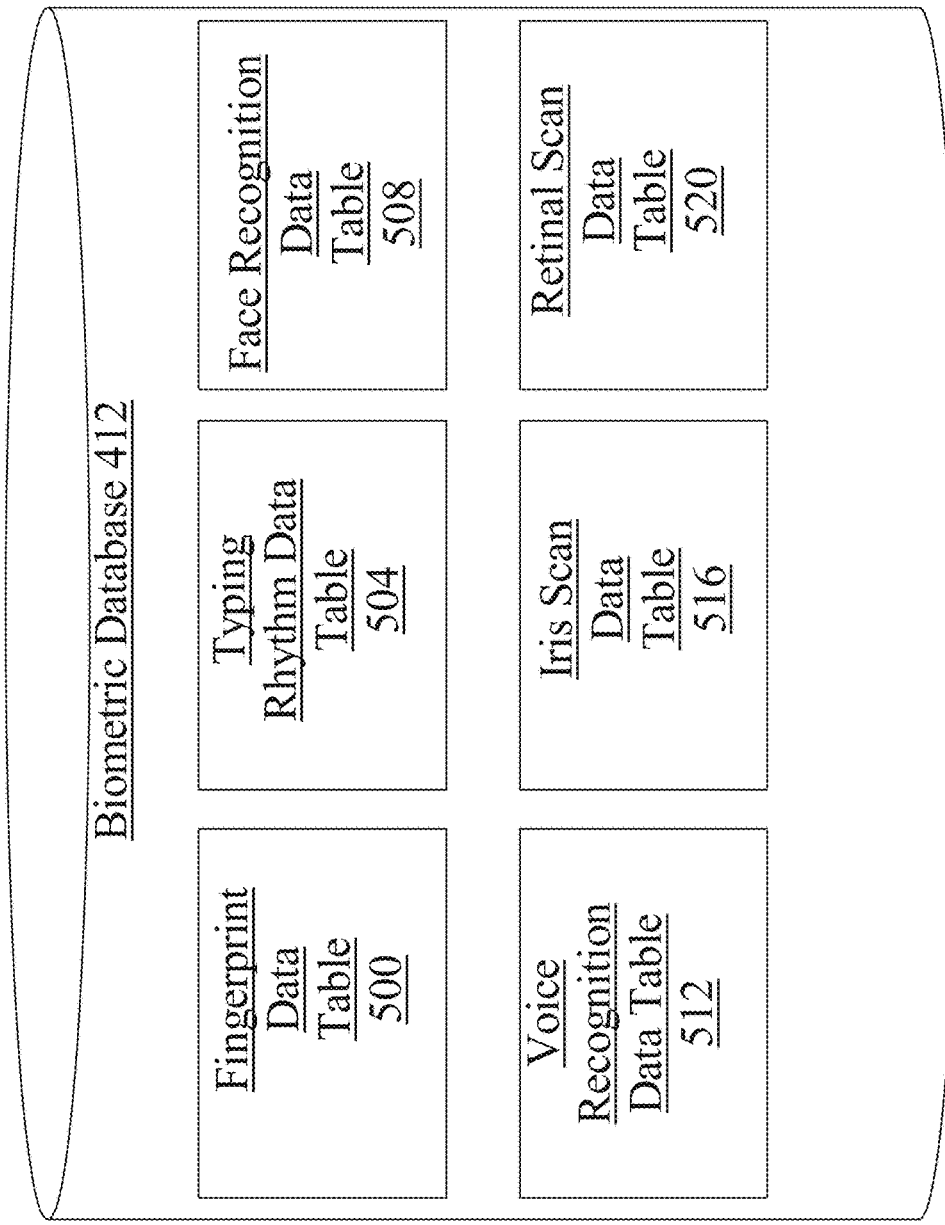
FIG. 5 is a depiction of an exemplary embodiment of a biometric database in accordance with the instant disclosure.

Referring now to FIG. 5, an exemplary embodiment of biometric database 412 is illustrated. Biometric database 412 may include any data structure for ordered storage and retrieval of data, which may be implemented as a hardware or software module. Biometric database 412 may be implemented, without limitation, as a relational database, a key-value retrieval datastore such as a NOSQL database, or any other format or structure for use as a datastore that a person skilled in the art would recognize as suitable upon review of the entirety of this disclosure. Biometric database 412 may include a plurality of data entries and/or records corresponding to elements of biometric datum as described above. Data entries and/or records may describe, without limitation, data concerning particular physiological characteristics and/or behavioral characteristics that have been collected. Data entries in a biometric database 412 may be flagged with or linked to one or more additional elements of information, which may be reflected in data entry cells and/or in linked tables such as tables related by one or more indices in a relational database; one or more additional elements of information may include data associating a biometric and/or a person from whom a biological extraction was extracted or received with one or more cohorts, including demographic groupings such as ethnicity, sex, age, income, geographical region, or the like. Additional elements of information may include one or more categories of biometric datum as described above. Persons skilled in the art, upon reviewing the entirety of this disclosure, will be aware of various ways in which data entries in a biometric database 412 may reflect categories, cohorts, and/or populations of data consistently with this disclosure.

Still referring to FIG. 5, one or more database tables in biometric database 412 may include, as a non-limiting example, a fingerprint data table 500. Fingerprint data table 500 may be a table matching biometric datum input from a remote device of the plurality of remote devices 116*a-n* as described above to fingerprint data. For instance, and without limitation, biometric database 412 may include a fingerprint data table 500 listing samples acquired from a user correlated to a remote device of the plurality of remote devices 116*a-n* having allowed the system 100 to retrieve fingerprint data from the user's remote device through fingerprint scanner, such as optical scanners or capacitive scanners, one or more rows recording such an entry may be inserted in fingerprint data table 500.

With continued reference to FIG. 5, biometric database 412 may include tables listing one or more samples according to sample source. For instance, and without limitation, biometric database 412 may include a typing rhythm database 504 listing samples acquired from a user by obtaining the user's keystroke dynamics when typing characters on a keyboard and/or keypad, such as the time to get to and depress a key, time the key is held down, use of caps-lock, pace of typing characters, misspellings, or the like. As another non-limiting example, biometric database 412 may include a face recognition data table 508, which may list samples acquired from a user correlated to a remote device of the plurality of remote devices 116*a-n* having allowed the system 100 to obtain digital images or video frames of the user's facial demographics, such as relative position, size, and/or shape of the eyes, nose, cheekbones, jaw, and/or the like. As a further non-limiting example, biometric database 412 may include a voice recognition data table 512, which may list samples acquired from a user correlated to a remote device of the plurality of remote devices 116*a-n* having allowed the system 100 to retrieve the user's unique voice patterns though a microphone located on the user's remote device, such as dictation variants, common phrases, volume level, dialect, pitch, format frequencies, and/or the like. As a further example, also non-limiting, biometric database 412 may include a iris scan data table 516, which may list samples acquired from a user correlated to a remote device of the plurality of remote devices 116*a*-*n* having allowed the system 100 to retrieve a user's iris scan from a camera located on a user's remote device, including without limitation images of the detailed structures of the iris which are visible externally. As another non-limiting example, biometric database 412 may include a retinal scan data table 520, which may include samples acquired from a user correlated to a user's remote device of the plurality of remote devices 116*a*-*n* having allowed system 100 to extract a user's retinal scan; retinal scans may include an image of the complex and unique structure of an individual's capillaries in the retina. Tables presented above are presented for exemplary purposes only; persons skilled in the art will be aware of various ways in which data may be organized in biometric database 412 consistently with this disclosure.

Referring again to FIG. 4, authentication module 128 may include or communicate with authentication database 416. Authentication database 416 may be implemented as any database and/or datastore suitable for use as an authentication database. An exemplary embodiment of an authentication database 416 is provided below in FIG. 6. Authentication module 128 is configured to store each verification element of each remote device of the plurality of remote devices within authentication database 416. Storage of each verification element of each remote device of the plurality of remote devices is based on the identification of the verification element within authentication, as described above. Verification element may include an authentication datum or a failed authentication datum, as described above in reference to FIG. 1. Persons skilled in the art, upon reviewing the entirety of this disclosure, will be aware of various additional examples for verification elements that may be received from authentication module 128 consistently with this disclosure.

Figure 6:
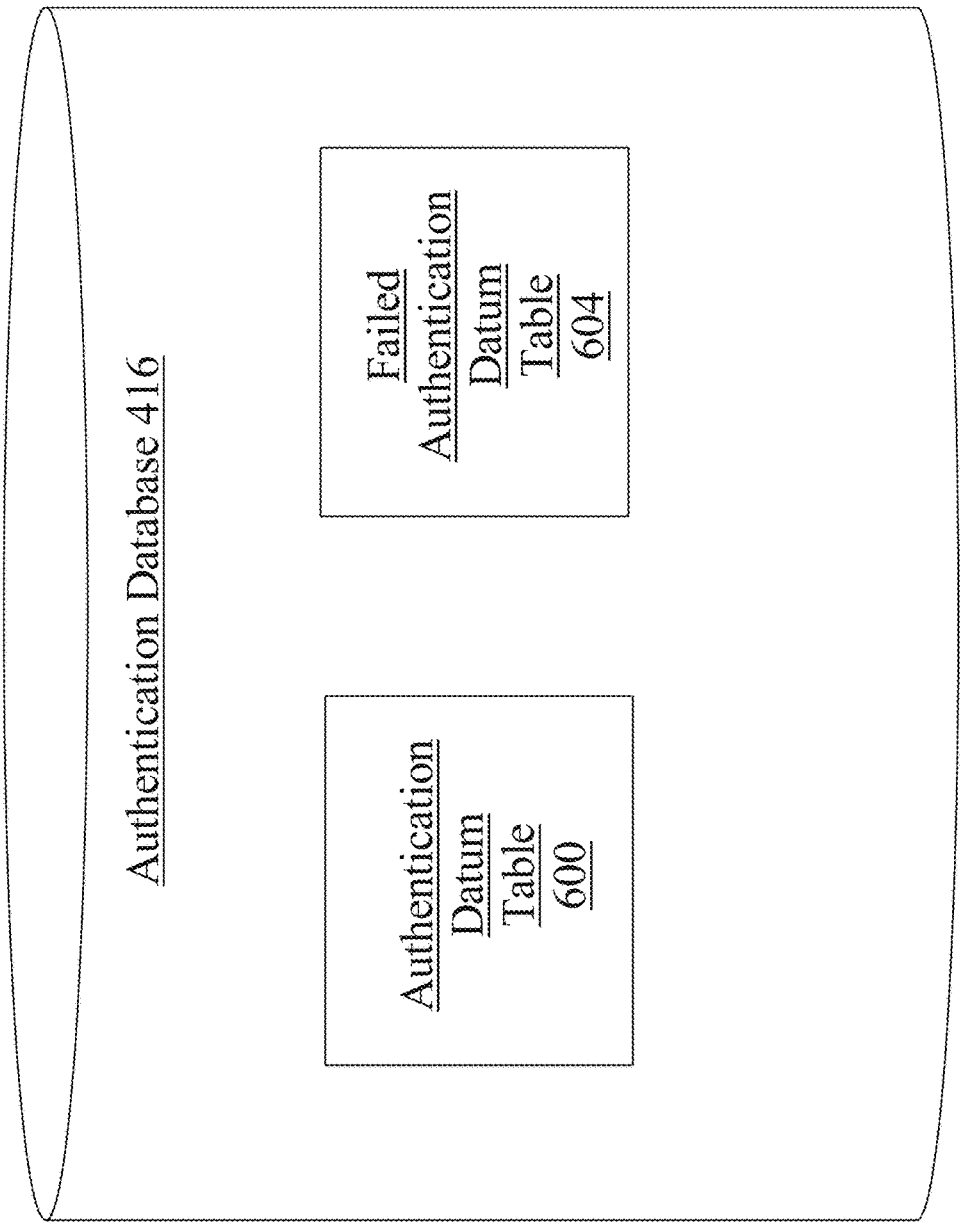
FIG. 6 is a depiction of an exemplary embodiment of an authentication database in accordance with the instant disclosure.

Referring now to FIG. 6, an exemplary embodiment of authentication database 416 is illustrated. Authentication database 416 may include any data structure for ordered storage and retrieval of data, which may be implemented as a hardware or software module. Authentication database 416 may be implemented, without limitation, as a relational database, a key-value retrieval datastore such as a NOSQL database, or any other format or structure for use as a datastore that a person skilled in the art would recognize as suitable upon review of the entirety of this disclosure. Authorization database 416 may include a plurality of data entries and/or records corresponding to verification elements as described above. Data entries and/or records may describe, without limitation, data concerning authentication datum and failed authentication datum.

Still referring to FIG. 6, one or more database tables in authentication database 416 may include, as a non-limiting example, an authentication datum table 600. Authentication datum table 600 may be a table storing and/or matching authentication datum from each verification element to each remote device of the plurality of remote devices 116*a*-*n*. For instance, and without limitation, authentication database 416 may include an authentication datum table 600 listing samples acquired from each verification element for each remote device of the plurality of remote devices 116*a*-*n* generated in authentication module 128, such as an element of authentication datum.

Still referring to FIG. 6, one or more database tables in authentication database 416 may include, as a non-limiting example, a failed authentication datum table 604. Failed authentication datum table 604 may be a table storing and/or matching failed authentication datum from each verification element to each remote device of the plurality of remote devices 116*a*-*n*. For instance, and without limitation, authentication database 416 may include a failed authentication datum table 604 listing samples acquired from each verification element for each remote device of the plurality of remote devices 116*a*-*n* generated in authentication module 128, such as an element of failed authentication datum. Tables presented above are presented for exemplary purposes only; persons skilled in the art will be aware of various ways in which data may be organized in authentication database 416 consistently with this disclosure.

Figure 7:
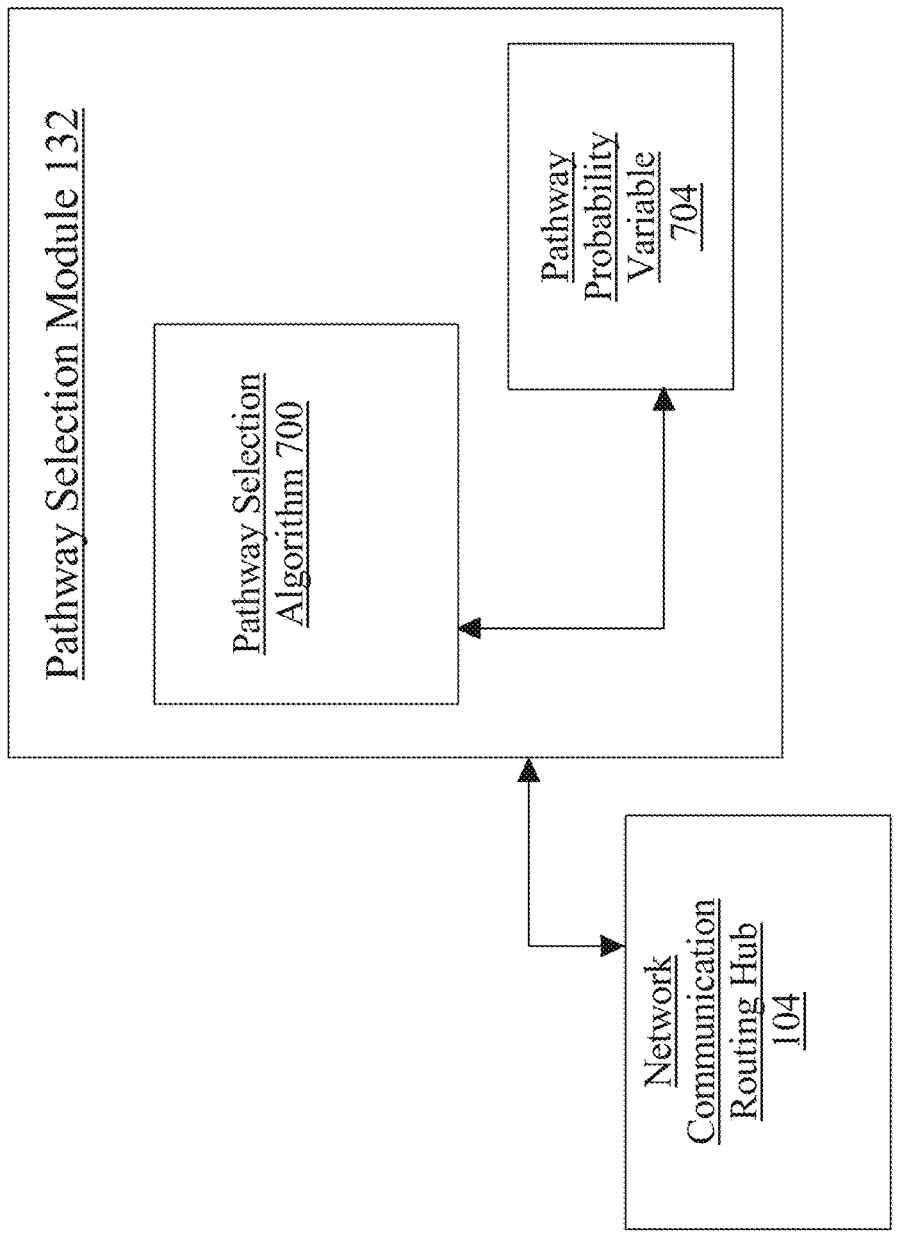
FIG. 7 is a schematic diagram illustrating an exemplary embodiment of a pathway selection module and associated system components.

Referring now to FIG. 7, an exemplary embodiment of a pathway selection module 132 is illustrated. Pathway selection module 132 may include any suitable hardware or software module. Pathway selection module 132 may include a pathway selection machine-learning algorithm 700. Pathway selection machine-learning algorithm 700 and/or pathway selection module may be configured to calculate for each remote device of the plurality of remote devices 116*a*-*n* a pathway probability variable 704 for each pathway of the plurality of electronic communication pathways 120*a*-*n* for each subject indicator. Calculating the pathway probability variable 704 may include multiplying the selected electronic communication pathway's probability variable, and/or a seed value representing and/or associated with the selected electronic communication pathway's probability variable, for each subject indicator by the volume of incoming communications for the selected electronic communication pathway of the plurality of electronic communication pathways 120*a*-*n* associated to the selected subject indicator and dividing the selected electronic communication pathway's pathway probability variable 704 for each subject indicator by the total count of pathway probability variables 704 for each subject indicator. For instance, without limitation, a specific remote device of the plurality of remote devices 116*a*-*n* accounts for five electronic communication pathways for a specific subject indicator out of a total fifty electronic communication pathways for the specific subject indicator. The specific remote device's pathway probability variable is multiplied by the five electronic communication pathways for the subject indicator. The pathway probability variable may initially begin with a numeric value of one, and/or one multiplied by a seed value, wherein after multiplication the remote device's pathway probability variable is five, and/or five multiplied by a seed value. The remote device's pathway probability variable for the specific subject indicator of five is divided by fifty, the total electronic communication pathways for the specific subject indicator. The remote device's pathway probability variable for the specific subject indicator is updated to 0.1 to reflect weighted chance of selecting the electronic communication pathway of the plurality of electronic communication pathways 120*a*-*n* for the specific remote device for the specific subject indicator.

Further referring to FIG. 7, pathway selection module 132 may be configured to calculate pathway probability variable based on one or more event sources, defined as sources of random, pseudorandom, and/or unpredictable data. One or more sources may be internal; for instance, and without limitation, a random number generator and/or pseudorandom number generator may produce a seed value which may be used to generate pathway probability variable. A seed value may, as a non-limiting example, be compared to a value corresponding to a particular specific remote device; remote device may be assigned value automatically and/or may generate and/or transmit value. For instance, and without limitation, specific remote device may transmit a number to system 100, which number and/or representation of number may be compared to a number used as seed value and/or a representation thereof. A seed value may be selected from a range of possible values, such as a random or pseudorandom number on a specified interval. A seed value may include a set of two or more numbers. Alternatively or additionally, a seed value may be directly compared to an identifier of specific remote device.

In an embodiment, and still referring to FIG. 7, pathway selection module 132 may generate a seed value as a function of an internal process that iteratively compares transmissions from one or more remote devices to additional transmissions of one or more remote devices and/or to one or more internal or external sources of random, pseudorandom, and/or unpredictable behavior, where "unpredictable" as used in this context indicates behavior having outcomes based on data unavailable to one or more remote devices. A series of iteratively processed transmissions may be conceptualized, in a non-limiting example, as a "game" in which a remote device submits inputs iteratively for comparison to one or more internal or external sources of random, pseudorandom, and/or unpredictable behavior; one or more internal or external sources of random, pseudorandom, and/or unpredictable behavior may be or be based on a single value and/or event, and/or one or more iteratively generated values and/or events. Values and/or events may be generated based on a stateless process performed per iteration, a stateful process performed per iteration based on states and/or values generated in previous iterations and/or inputs received from one or more remote devices in previous iterations and/or in a current iteration, or the like. Remote devices may be configured by system 100 to display representations of a current state to users of remote devices, for instance in the form of visual representations of states, inputs from other remote devices, inputs of a remote device performing display, or the like; inputs may be keyed by user selections of one or more displayed options, user entry of commands, numbers, or other data values, or the like.

With further reference to FIG. 7, an external source of random, pseudorandom and/or unpredictable data may be used by pathway selection module to generate a seed value. For instance, and without limitation, an input may be received describing an outcome of an external event, which input may be used to generate seed value. A seed value may subsequently be used to generate pathway probability variable, for instance as a function of one or more previous, concurrent, or subsequently received inputs from one or more remote devices, which inputs may be matched to and/or otherwise compared to seed values. One or more inputs from a remote device may be conceptualized, as non-limiting example, as a prediction and/or guess, whether automatically or user-generated, concerning an outcome of an external event.

With continued reference to FIG. 7, pathway selection machine-learning algorithm 700 and/or other algorithms as described in this disclosure may be performed by a computing device/module to produce outputs given data provided as inputs. Pathway selection machine-learning algorithm used to generate for each remote device of the plurality of remote devices 116*a-n* a pathway probability variable for each pathway of the plurality of electronic communication pathways 120*a-n* for each subject indicator may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
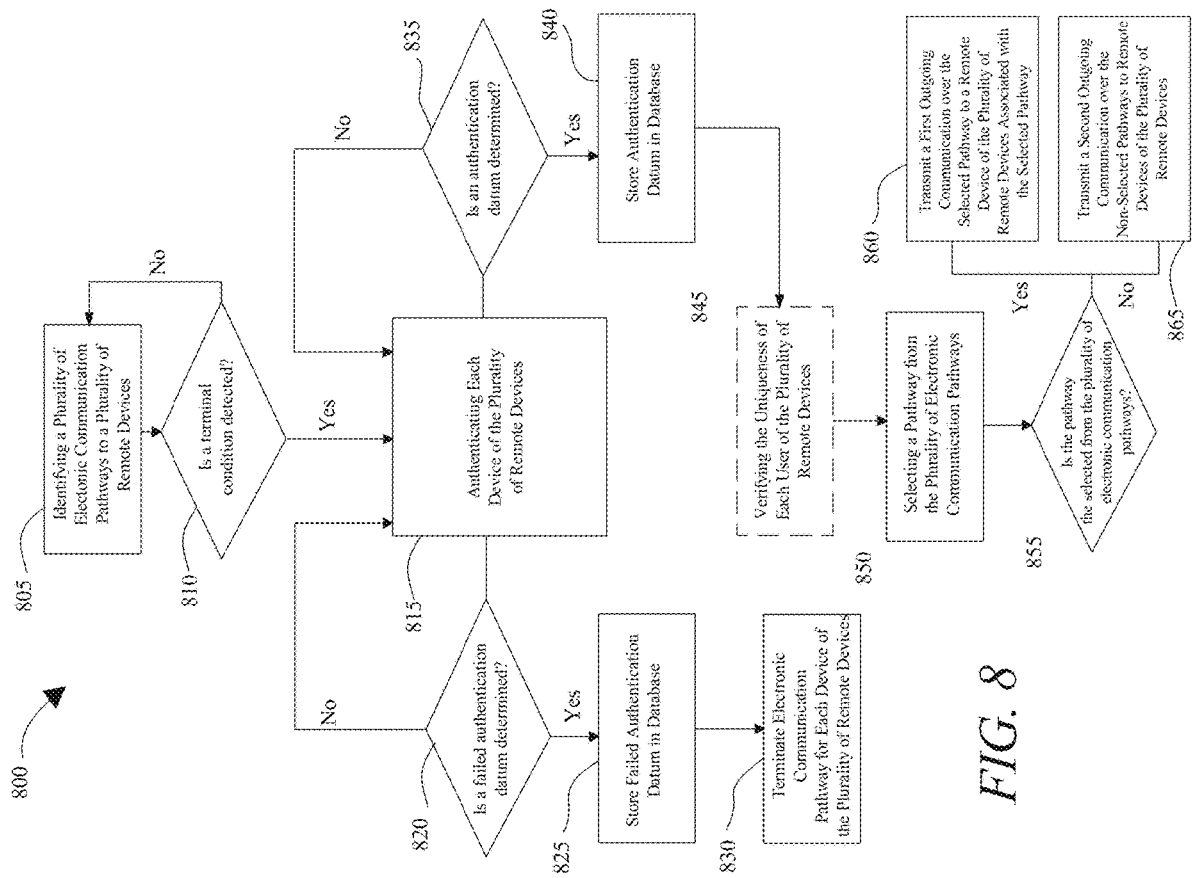
FIG. 8 is a flow diagram illustrating an exemplary method of selecting an electronic communication pathway from a pool of potential pathways.

Referring now to FIG. 8, an exemplary embodiment of a method 800 of selecting an electronic communication pathway from a pool of potential pathways is illustrated. At step 805, a network communication routing hub 108 identifies a plurality of electronic communication pathways 120*a-n*. Network communication routing hub 108 may include, without limitation, a network communication routing hub 108 as described above in reference to FIG. 1. Identifying the plurality of electronic communication pathways 120*a-n* may include receiving a plurality of incoming communications from a plurality of remote network devices 116*a-n*; the plurality of remote network devices 116*a-n* may include, without limitation, a plurality of remote network devices 116*a-n* as described above in reference to FIG. 1. Each incoming communication may be received as a single transmission or in one or more separate transmissions, each of which may be preceded and/or followed by communications transmitted by network communication routing hub 108. For instance, and without limitation, each incoming communication may include each incoming communication as described above in reference to FIGS. 1-7. Each remote network device of the plurality of remote network devices 112*a-n* may be connected to the network communication routing hub 104 by an electronic communication pathway, for instance as described above in reference to FIG. 1.

In an embodiment, and continuing to refer to FIG. 8, each incoming communication of the plurality of incoming communications may contain a subject indicator linking the communication to a pool of potential pathways; the pool of potential pathways may be a set of electronic communication pathways from which a plurality of electronic communication pathways 120*a-n* may be selected. For instance, and without limitation, pool of potential pathways may include one or more pathways with regard to which subsequent steps such as authentication, filtering for duplicates, or the like may not have been performed yet; the pool of potential pathways may be reduced by such steps as one or more pathways in the pool is removed for failing authentication, as representing a duplicate user and/or device, or the like. A subject indicator may include, without limitation, a numerical or other textual code associated in memory of network communication routing hub 108, application server 120, and/or server 104 with a subject of communication, for instance as described above in reference to FIGS. 1-2. Step 810 requires a detection of a terminal condition. Terminal conditional may include, without limitation, terminal conditions as described above in reference to FIG. 1. If NO, program flow continues back to step 805 wherein network communication hub 108 continues to identify a plurality of electronic communication pathways to a plurality of remote devices. If YES, the program flow continues on to step 815.

At step 815, and still referring to FIG. 8, authentication module 128 operating on the at least a server 104 authenticates each device of the plurality of remote network devices 116a-n. Authentication, as used herein, is a determination that remote device of the plurality of remote devices and/or a user of the remote device is permitted to participate in a current iteration of method 800; authentication may include a determination that remote device and/or user is permitted to participate in a transaction, such as a transaction for distribution of an item of value and/or rights to an item of value as set forth in further detail below. Any remote device that fails authentication and/or is associated with a user that fails authentication, may have its associated network communication pathway removed from pool of potential pathways, where failure of authentication may include a conclusion, in any test or series of tests performed in the course of authentication as described in this disclosure, that remote device and/or user is not permitted to participate in embodiment of method 800.

With continued reference to FIG. 8, authentication may include authentication of remote device itself. Authentication of remote device may include, without limitation, comparison of a remote device to a "device fingerprint" describing one or more settings of remote device; such a fingerprint may be used, without limitation to verify that the remote device matches a device previously used by user seeking to be authenticated, that the remote device does not match a device previously used by a user that is not authenticated for any reason described below (e.g., a user attempting to skirt authentication with a pseudonym or fake identity), or the like. Device authentication may include receipt of a digital signature and/or digital certificate as described above from remote device; authentication module 128 may evaluate such digital signature and/or digital certificate as described above. Device authentication may include comparison of an internet protocol (IP) address or other network address currently used by remote device to a past address; device authentication may include an approximate determination of a geographical location of remote device, for instance via IP geolocation processes matching IP addresses to geographical locations. Each of the above-described data concerning remote device may be compared to one another and/or to user authentication data and/or user data; for instance, and without limitation, identity and/or location of device as determined by the above-described methods may be compared to information stored regarding and/or provided by a user, to verify that user-provided data is or is not accurate, to identify a user that is not permitted to engage in transaction, or the like.

Still viewing FIG. 8, authentication may include user authentication. User authentication may, for instance, include receiving in an incoming communication, user logon credentials such as, without limitation, a user identifier or "username" and/or a user password. User authentication may include receiving one or more items of secret information from a user; for instance, and without limitation, authentication module 128 may communicate with network communication routing hub 108 to send user one or more "security questions" asking user for secret information, which user may have previously submitted to system 100.

Still viewing FIG. 8, authentication may include pathway numeric verification whereby pathway numeric verification unit 400 comprises validating the user's financial ability to participate in an embodiment of method 800 and/or a transaction as described herein for a transfer of an item of value and/or rights thereto is assessed; ability to participate may include ability to absorb losses from participation in transactions. Pathway numeric verification may include, without limitation, a credit check or check of a user's consumer report, a check of one or more account balances of accounts as provided by user, verification of income or assets, or the like for instance as described above in reference to FIG. 1-6. Authentication may further include pathway age verification whereby pathway age verification unit 404 comprises determining if a user's birth datum surpasses at least a threshold age, such as a minimum age requirement to participate in an embodiment of method 800 and/or a transaction as described herein for a transfer of an item of value and/or rights thereto is assessed. Pathway age verification may include comparison of the threshold age to, without limitation, user's birth datum, such as without limitation user input of the user's date of birth for instance as described above in reference to FIGS. 1-6.

With continued reference to FIG. 8, authentication may further include pathway biometric verification whereby pathway biometric verification unit 408 comprises performing pathway biometric verification of each device of the plurality of remote devices 116a-n to participate in an embodiment of method 800 and/or a transaction as described herein for a transfer of an item of value and/or rights thereto is assessed; ability to participate may include verifying the identity of the user. Pathway biometric verification comprises receiving at least a biometric datum from each device of the plurality of remote devices 116a-n and matching the at least a biometric datum for each remote device of the plurality of remote devices 116a-n to a correlated biometric datum stored within biometric database 412, as described above in reference to FIGS. 1-6.

Still referencing FIG. 8, step 820 requires a determination of a failed authentication datum during authenticating each device of the plurality of remote devices of method 800, as described in detail above. If NO, program flow continues back to step 815 and authentication of each remote device of the plurality of remote devices continues until a failed authentication datum is determined for each remote device of the plurality of remote devices. If YES, a failed authentication datum for the specific remote device of the plurality of remote devices 116a-n is detected, program flows on to step 825. In step 825, the determined failed authentication datum is stored in authentication database 416, as described above in reference to FIGS. 4-6. Step 830 comprises terminating the electronic communication pathway 120a-n for each device of the plurality of remote devices associated to the failed authentication datum. Terminating may include for instance without limitation eliminating the electronic communication pathway 120a-n for each device of the plurality of remote devices associated to the failed authentication datum from the pool of electronic communication pathways as described above.

Continuing to refer to FIG. 8, step 835 requires a determination of authentication datum during authentication of each device of the plurality of remote devices of method 800, as described in detail above. If NO, program flow continues back to step 815 and authentication of each remote device of the plurality of remote devices continues until an authentication datum is determined for each remote device of the plurality of remote devices. If YES, an authentication datum for the specific remote device of the plurality of remote devices 116a-n is detected, program flows to step 840. In step 840, the determined authentication datum for the specific remote device of the plurality of remote devices 116*a-n* is stored in an authentication database 416, as described above in reference to FIGS. 4-6.

At step 845, and continuing to refer to FIG. 8, network communication routing hub 108 may verify uniqueness of each user of the plurality of remote network devices 116*a-n*. Determination of uniqueness may include, without limitation, checking user authentication data to ensure that each user only participates a single time. Determination of uniqueness may also include, without limitation, identification of remote device, including by processes described above for device authentication, as associated with a particular user, to eliminate the use of pseudonyms, fake identities, and/or "sock puppet" accounts. Verification of uniqueness may, for instance, prevent a single user from "gaming" a transaction by overrepresenting him or herself within an iteration of an embodiment of method 800, a step or set of steps of method 800 and/or a transaction as described herein for a transfer of an item of value and/or rights.

At step 850, and still referring to FIG. 8, pathway selection module 132 operating on the at least a server 104 selects a pathway from the plurality of electronic communication pathways 120*a-n* based on pathway probability variable 704. Pathway probability variable 704 operates as a function of pathway selection algorithm 700. The pathway probability variable 704 may include without limitation the weighted selection probability of each pathway of the plurality of electronic communication pathways 120*a-n*, as described above in reference to FIGS. 1-7. In an embodiment, pathway selection algorithm 700 comprises determining the pathway probability variable 704 based on incoming communication of the plurality of incoming communications as a function of each remote device of the plurality of remote devices 116*a-n* and a specific subject indicator, updating the pathway probability variable for each pathway of each remote device of the plurality of remote devices 116*a-n* based on pathway selection algorithm 700, as described above in reference to FIG. 7. As a non-limiting example, where method 800 includes a process for selecting a recipient of an item of value and/or a right thereto, selection of electronic communication pathway may include selection of a pathway associated with a user who will receive the item and/or right thereto. Selection of pathway may include selection of a user account and/or of user identification and/or authentication information associated with a user that is to receive the item of value and/or right thereto; for instance, arrangement of electronic communication pathways according to indices as described above may be accomplished by arrangement of user-identifying information according to indices.

Still referring to FIG. 8, pathway probability variable may be generated according to any process, algorithm, and/or methodology described above, including without limitation generation of a seed value and use of seed value to generate pathway probability variable, for instance and without limitation by comparison to one or more one-time and/or iteratively generated outputs and/or states, one or more one-time or iteratively received inputs from remote device and/or remote devices, or the like. Input process may include gamification as described above, which gamification may be represented to a user of a remote device as any game, including without limitation card games such as poker, blackjack, bridge, pinochle, or the like, tile games such as mahjong, dominoes, or the like, board games such as checkers, chess, backgammon, go, or the like, dice games, bingo, and/or any other game of chance or skill, or virtual representation thereof which one, two or more players may engage in. Seed value may alternatively or additionally be compared to one or more numbers and/or values generated for and/or received from one or more remote devices; such values may be represented as "lottery" submissions, and/or submissions to a lottery process, an outcome of which may represent selection and/or generation of pathway probability variable.

With further reference to FIG. 8, a seed value may be generated, selected, and/or received as a function of one or more external sources of random, pseudorandom, and/or unpredictable data such sources may include outcomes of athletic events, video game competitions, business ventures, elections, court cases, weather, and/or any other process about which predictions may be made as a function of luck or skill. One or more inputs from a remote device may be conceptualized, as non-limiting example, as a prediction and/or guess, whether automatically or user-generated, concerning an outcome of an external event. Submissions from remote devices may include predictions concerning such outcomes and/or include a "bet" on an outcome, or a series of such predictions, bets, or the like. Submissions may include selection of one or more event generation participants, processes, or the like, such as without limitation selection of one or more teams, players on one or more teams, or the like performance of which may be used as inputs to a game such as a virtual sporting event. For instance, and without limitation, submissions from one or more remote devices may concern, and/or be compared to external athletic or other events according to a sports fantasy process such as "fantasy football," "fantasy baseball," or the like. Submissions may include selections of teams and/or players to virtual rosters, submissions guessing which team will win and/or exceed a point spread, which player and/or team will score first, achieve a given statistical achievement, or the like, or other such predictions.

Still referencing FIG. 8, step 855 requires a determination of whether the electronic communication pathway is the selected electronic communication pathway of the plurality of electronic communication pathways 120*a-n* of step 850. If YES, the pathway is the selected electronic communication pathway of the plurality of electronic communication pathways, program flows to step 860. If NO, program flows to step 865.

At step 860, and continuing to refer to FIG. 8, pathway selection module 132 transmits a first outgoing communication over selected pathway to a remote network device of the plurality of remote network devices 116*a-n* associated with selected pathway via network communication routing hub 108. First outgoing communication may, as a non-limiting example, inform a user associated with a selected electronic communication pathway that the user is a chosen recipient of an item of value or a right thereto, as described above in reference to FIG. 1. Step 865 comprises pathway selection module 132 operating on at least a server 104 transmits a second outgoing communication over the non-selected pathways to the remaining remote devices of the plurality of remote devices within the pool of communications associated with a specified subject indicator. Second outgoing communication may, as a non-limiting example, inform users associated with selected electronic communication pathways that the users were not chosen as the recipient of an item of value or right thereto, as described above in reference to FIG. 1.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
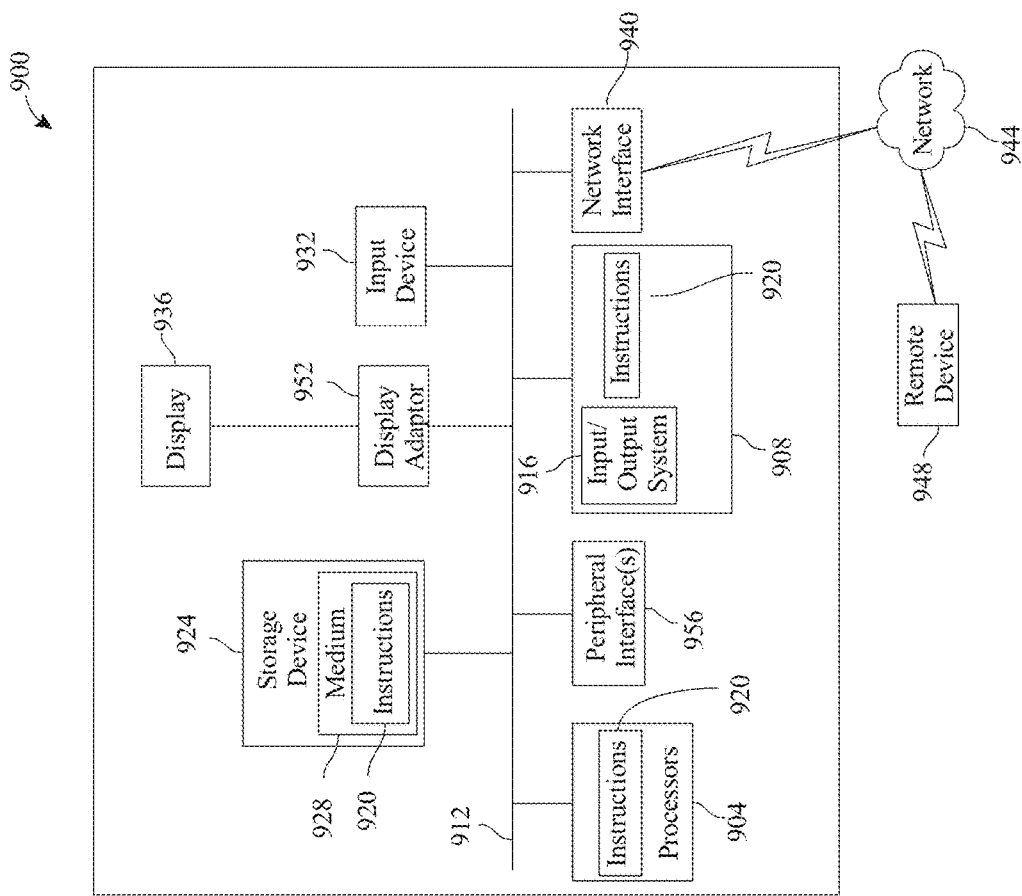
FIG. 9 is a high-level block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for selecting an electronic communication pathway from a pool of potential pathways, the system comprising:
    at least a server;
    a network communication routing hub operating on the at least a server, wherein the network communication routing hub is configured to:
    identify a plurality of electronic communication pathways, wherein identifying the plurality of electronic communication pathways further comprises receiving a plurality of incoming communications from a plurality of remote devices, wherein:
        each remote device of the plurality of remote devices is connected to the network communication routing hub by a respective electronic communication pathway of the plurality of electronic communication pathways; and
        each incoming communication of the plurality of incoming communications contains a subject indicator linking the incoming communication to the pool of potential pathways;
    an authentication module operating on the at least a server, wherein the authentication module is configured to:
    authenticate each remote device of the plurality of remote devices, wherein authenticating each remote device further comprises:
        determining at least a respective verification element for each remote device of the plurality of remote devices, wherein each respective verification element is further configured to include an authentication datum of a respective remote device; and
        transmit each at least a verification element to a respective remote device of the plurality of remote devices;
    a pathway selection module operating on the at least a server, wherein the pathway selection module is configured to:
    select, based on a pathway probability variable, a pathway from the plurality of electronic communication pathways, wherein the pathway probability variable is derived as a function of a pathway selection algorithm, wherein the pathway selection algorithm is further configured to determine the pathway probability variable as a function of at least a seed value as a function of each remote device and the subject indicator, wherein the seed value is generated by the pathway selection module as a function of at least an event source;
    transmit a first outgoing communication over the selected pathway to a respective remote device of the plurality of remote devices associated with the selected pathway; and
    transmit a second outgoing communication over the non-selected pathways to the remaining remote devices of the plurality of remote devices.

2. The system of claim 1, wherein the at least a server is further configured to include a prospective opportunities engine operating on the at least a server, wherein the prospective opportunities engine is further configured to:

receive training data, wherein receiving training data further comprises:
  receive at least a first training set including a plurality of first data entries, each first data entry of the plurality of data entries including the at least an element of subject indicator data and a correlated compatible label;
  receive the at least an incoming communication of the plurality of incoming communications from each remote device of the plurality of remote devices associated with a selected pathway;
  create at least a first machine-learning model relating subject indicator data to compatible labels using the at least a first training set;
  generate at least a compatible output using the first machine-learning model and the at least an incoming communication; and
  transmit the at least a compatible output over the selected pathway to a remote device of the plurality of remote devices associated with the selected pathway.

3. The system of claim 1, wherein the subject indicator contained in each incoming communication of the plurality of communications is further configured to include an item of value.

4. The system of claim 1, wherein the network communication routing hub is further configured to:
  detect a terminal condition; and
  identify the plurality of electronic communication pathways based on the detection of the terminal condition.

5. The system of claim 1, wherein authentication contained in the authentication module is further configured to:
  perform pathway numeric verification of each device of the plurality of remote devices, wherein pathway numeric verification is further configured to:
    validate the user's financial ability to participate in the pool of potential electronic communication pathways; and
    generate at least a verification element for each device of the plurality of remote devices;
  perform pathway age verification of each device of the plurality of remote devices, wherein pathway age verification is further configured to:
    receive the user's birth datum to determine if the user surpasses at least a threshold age; and
    generate at least a verification element for each device of the plurality of remote devices;
  perform pathway biometric verification of each device of the plurality of remote devices, wherein pathway biometric verification is further configured to:
    receive at least a biometric datum from each remote device of the plurality of remote devices; and
    match the at least a biometric datum from each remote device of the plurality of remote devices to a correlated biometric datum stored within a database; and
    generate at least a verification element for each device of the plurality of remote devices.

6. The system of claim 1, wherein the authentication module is further configured to:
  identify at least a failed authentication datum of the plurality of remote devices, wherein identifying at least a failed authentication datum of the plurality of remote devices is further configured to:
    match at least a failed authentication datum for each remote device of the plurality of remote devices stored within a database; and
    terminate the electronic communication pathway based on the identification of the failed authentication datum.

7. The system of claim 1, wherein the authentication module is further configured to store an element of failed authentication datum of each remote device of the plurality of remote devices within a database based on the identification of the element of failed authentication datum within authentication.

8. The system of claim 1, wherein the at least an event source includes at least an external event.

9. The system of claim 1, wherein the pathway selection algorithm is further configured to:
  iteratively generate the at least a seed value as a function of a series of event sources.

10. A method of selecting an electronic communication pathway from a pool of potential pathways, the method comprising:
  identifying, by a network communication routing hub operating on at least a server, a plurality of electronic communication pathways, wherein identifying the plurality of electronic communication pathways further comprises receiving a plurality of incoming communications from a plurality of remote devices, wherein:
    each remote device of the plurality of remote devices is connected to the network communication routing hub by a respective electronic communication pathway of the plurality of electronic communication pathways; and
    each incoming communication of the plurality of incoming communications contains a subject indicator linking the incoming communication to the pool of potential pathways;
  authenticating, by an authentication module operating on the at least a server, each device of the plurality of remote devices wherein authenticating each remote device further comprises:
    determining at least a respective verification element for each remote device of the plurality of remote devices, wherein each respective verification element is further configured to include an authentication datum of a respective remote; and
    transmitting each at least a verification element to a respective remote device of the plurality of remote devices;
  selecting, by a pathway selection module operating on the at least a server, based on a pathway probability variable a pathway from the plurality of electronic communication pathways, wherein the pathway probability variable operates as a function of a pathway selection algorithm, wherein the pathway selection algorithm comprises:
    determining the pathway probability variable as a function of at least a seed value as a function of each remote device and the subject indicator, wherein the seed value is generated by the pathway selection module as a function of at least an event source;
  transmitting, by a pathway selection module operating on at least a server, a first outgoing communication over the selected pathway to a remote device of the plurality of remote devices associated with the selected pathway; and
  transmitting, by a pathway selection module operating on at least a server, a second outgoing communication over the non-selected pathways to the remaining remote devices of the plurality of remote devices.

11. The method of claim 10, wherein the at least a server further comprises a prospective opportunities engine operating on the at least a server wherein the prospective opportunities engine further comprises:

receiving training data, wherein receiving training data further comprises:
  receiving at least a first training set including a plurality of first data entries, each first data entry of the plurality of data entries including at least an element of subject indicator data and a correlated compatible label;
  receiving at least an incoming communication of the plurality of communications from each remote device of the plurality of remote devices associated with a selected pathway;
creating at least a first machine-learning model relating subject indicator data to compatible labels using the at least a first training set;
generating at least a compatible output using the first machine-learning model and the at least an incoming communication; and
transmitting the at least a compatible output over the selected pathway to a remote device of the plurality of remote devices associated with the selected pathway.

12. The method of claim 10, wherein the subject indicator contained in each incoming communication of the plurality of communications further includes an element of value.

13. The method of claim 10, wherein the network communication routing hub further comprises:
  detecting a terminal condition; and
  identifying the plurality of electronic communication pathways based on the detection of the terminal condition.

14. The method of claim 10, wherein authentication contained in the authentication module further comprises:
  performing pathway numeric verification of each device of the plurality of remote devices, wherein pathway numeric verification further comprises:
    validating the user's financial ability to participate in the pool of potential electronic communication pathways; and
    generating at least a verification element for each device of the plurality of remote devices;
  performing pathway age verification of each device of the plurality of remote devices, wherein pathway age verification further comprises:
    receiving at least a user's birth datum to determine if the user surpasses at least a threshold age; and
    generating at least a verification element for each device of the plurality of remote devices;
  performing pathway biometric verification of each device of the plurality of remote devices, wherein pathway biometric verification further comprises:
    receiving at least a biometric datum from each remote device of the plurality of remote devices; and
    matching the at least a biometric datum from each remote device of the plurality of remote devices to a correlated biometric datum stored within a database; and
    generating at least a verification element for each device of the plurality of remote devices.

15. The method of claim 10, wherein the authentication module operating on the at least a server further comprises:
  identifying at least a failed authentication datum of the plurality of remote devices, wherein identifying at least a failed authentication datum of the plurality of remote devices further comprises:
    matching at least a failed authentication datum for each remote device of the plurality of remote devices stored within a database; and
  terminating the electronic communication pathway based on the identification of the failed authentication datum.

16. The method of claim 10, wherein an authentication module further comprises storing at least an element of failed authentication datum of each remote device of the plurality of remote devices within a database based on the identification of the element of failed authentication datum within authentication.

17. The system method of claim 10, wherein generating the at least seed value further comprises generating the at least seed value as a function of at least an event source.

18. The method of claim 17, wherein the at least an event source includes at least an external event.

19. The system method of claim 10, generating the at least a seed value further comprises iteratively generating the at least a seed value as a function of a series of event sources.

* * * * *